United States Patent
Tanaka et al.

(10) Patent No.: US 10,848,277 B2
(45) Date of Patent: Nov. 24, 2020

(54) COMMUNICATION DEVICE AND COMMUNICATION METHOD

(71) Applicant: Sony Corporation, Tokyo (JP)

(72) Inventors: Yusuke Tanaka, Tokyo (JP); Shigeru Sugaya, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/304,699

(22) PCT Filed: Aug. 22, 2017

(86) PCT No.: PCT/JP2017/029896
§ 371 (c)(1),
(2) Date: Nov. 27, 2018

(87) PCT Pub. No.: WO2018/043202
PCT Pub. Date: Mar. 8, 2018

(65) Prior Publication Data
US 2019/0305895 A1    Oct. 3, 2019

(30) Foreign Application Priority Data

Sep. 5, 2016   (JP) .................................. 2016-172432

(51) Int. Cl.
*H04L 1/18*   (2006.01)
(52) U.S. Cl.
CPC .......... *H04L 1/1825* (2013.01); *H04L 1/1887* (2013.01)

(58) Field of Classification Search
CPC ........................... H04L 1/1887; H04L 1/1825
USPC .......................................................... 370/328
See application file for complete search history.

(56) References Cited

U.S. PATENT DOCUMENTS

| | | | |
|---|---|---|---|
| 10,305,639 B2* | 5/2019 | Baldemair | H04L 1/1825 |
| 2011/0164697 A1* | 7/2011 | Liao | H04B 7/024 375/260 |
| 2017/0005758 A1* | 1/2017 | Baldemair | H04L 1/1825 |
| 2017/0367118 A1* | 12/2017 | Choi | H04W 84/12 |
| 2018/0324859 A1* | 11/2018 | Kim | H04W 12/06 |
| 2019/0254121 A1* | 8/2019 | Yang | H04W 76/30 |

FOREIGN PATENT DOCUMENTS

| | | |
|---|---|---|
| JP | 2006-121561 A | 5/2006 |
| JP | 5437307 B2 | 3/2014 |
| WO | 2015/094069 A1 | 6/2015 |

OTHER PUBLICATIONS

International Search Report and Written Opinion for International Application No. PCT/JP2017/029896, dated Dec. 1, 2017.

* cited by examiner

*Primary Examiner* — Peter G Solinsky
(74) *Attorney, Agent, or Firm* — Xsensus LLP

(57) ABSTRACT

Provided is a communication device configured to operate in a plurality of communication modes and maintain information related to retransmission of data in accordance with switching of the communication modes.

20 Claims, 13 Drawing Sheets

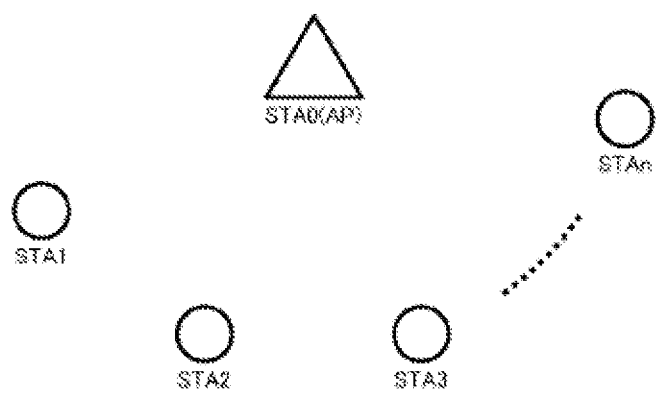
[Fig. 1]

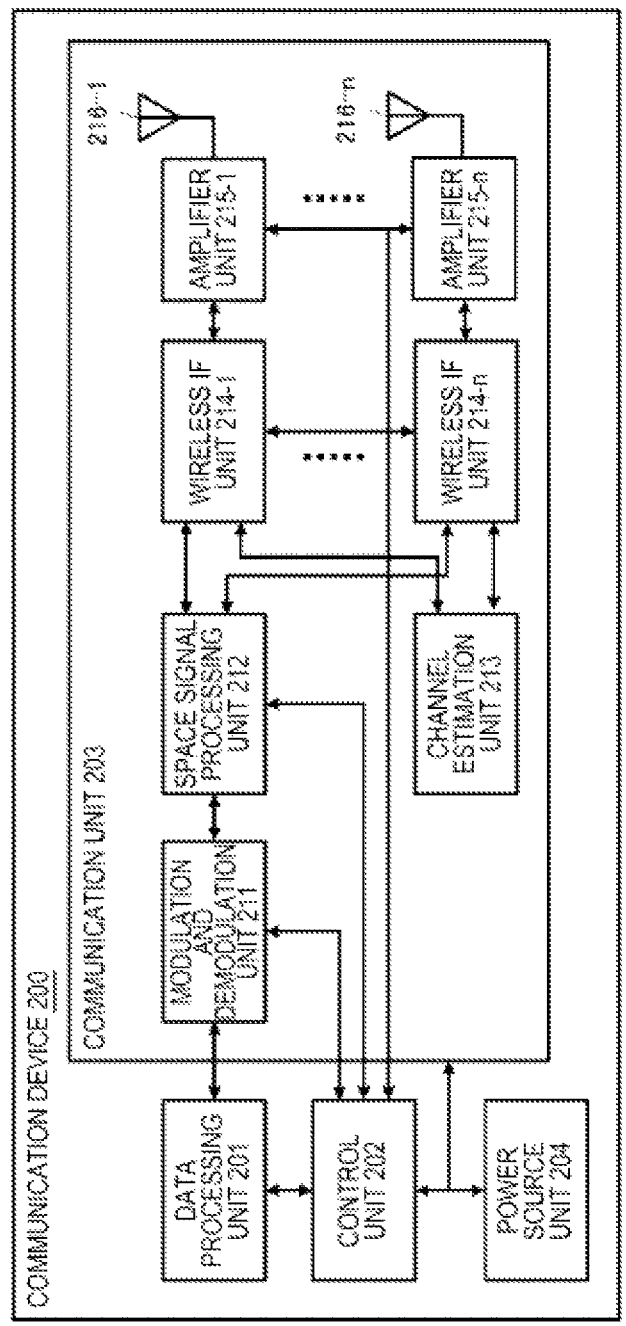
[Fig. 2]

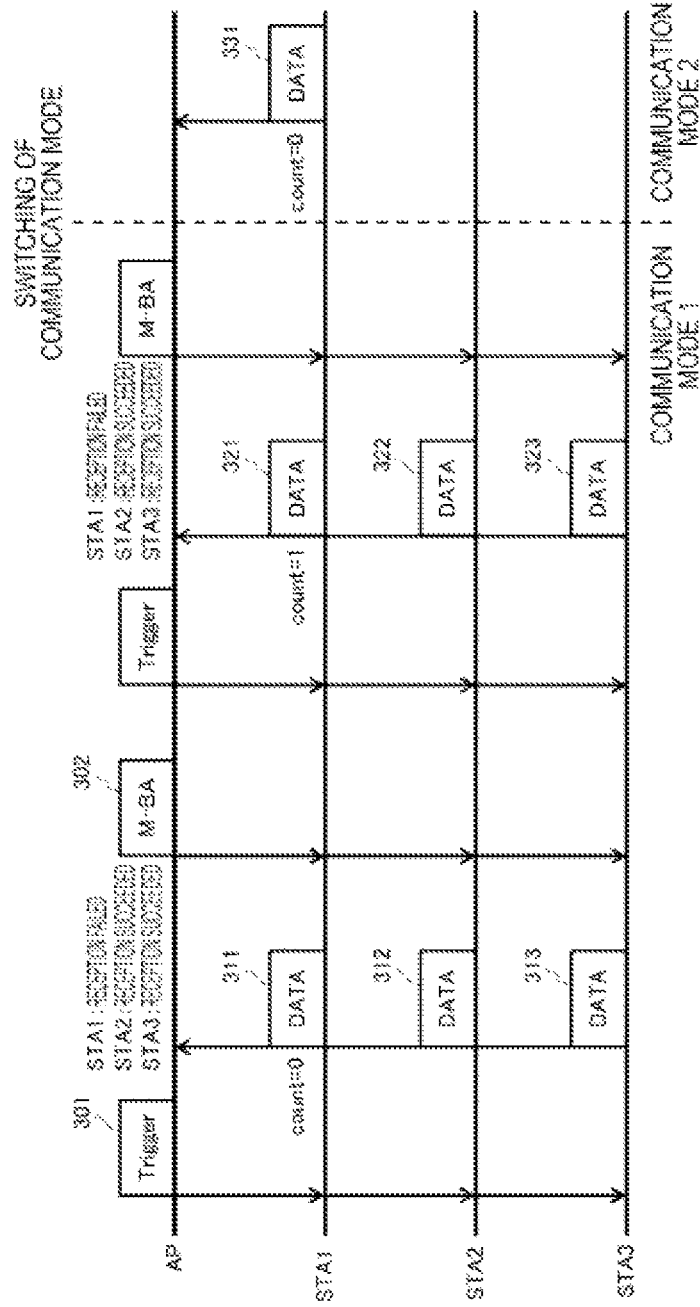
[Fig. 3]

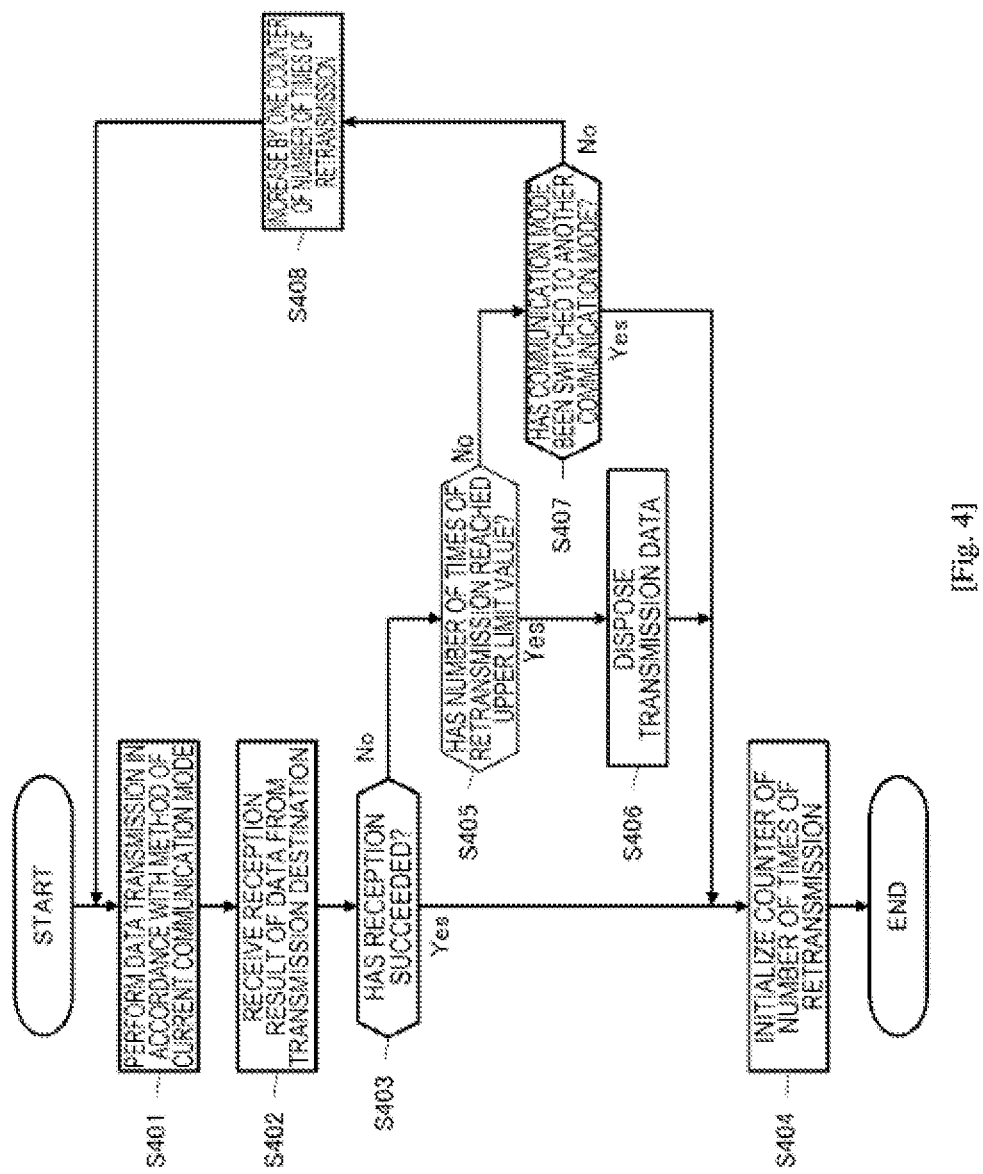
[Fig. 4]

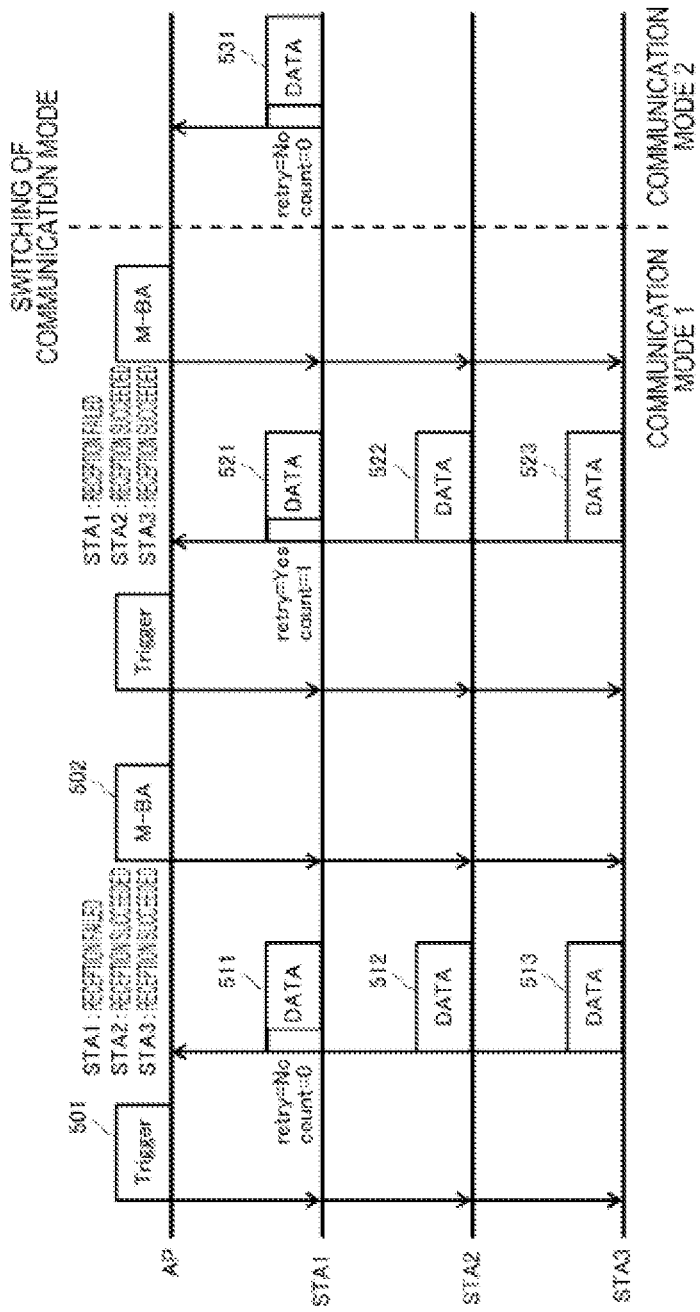
[Fig. 5]

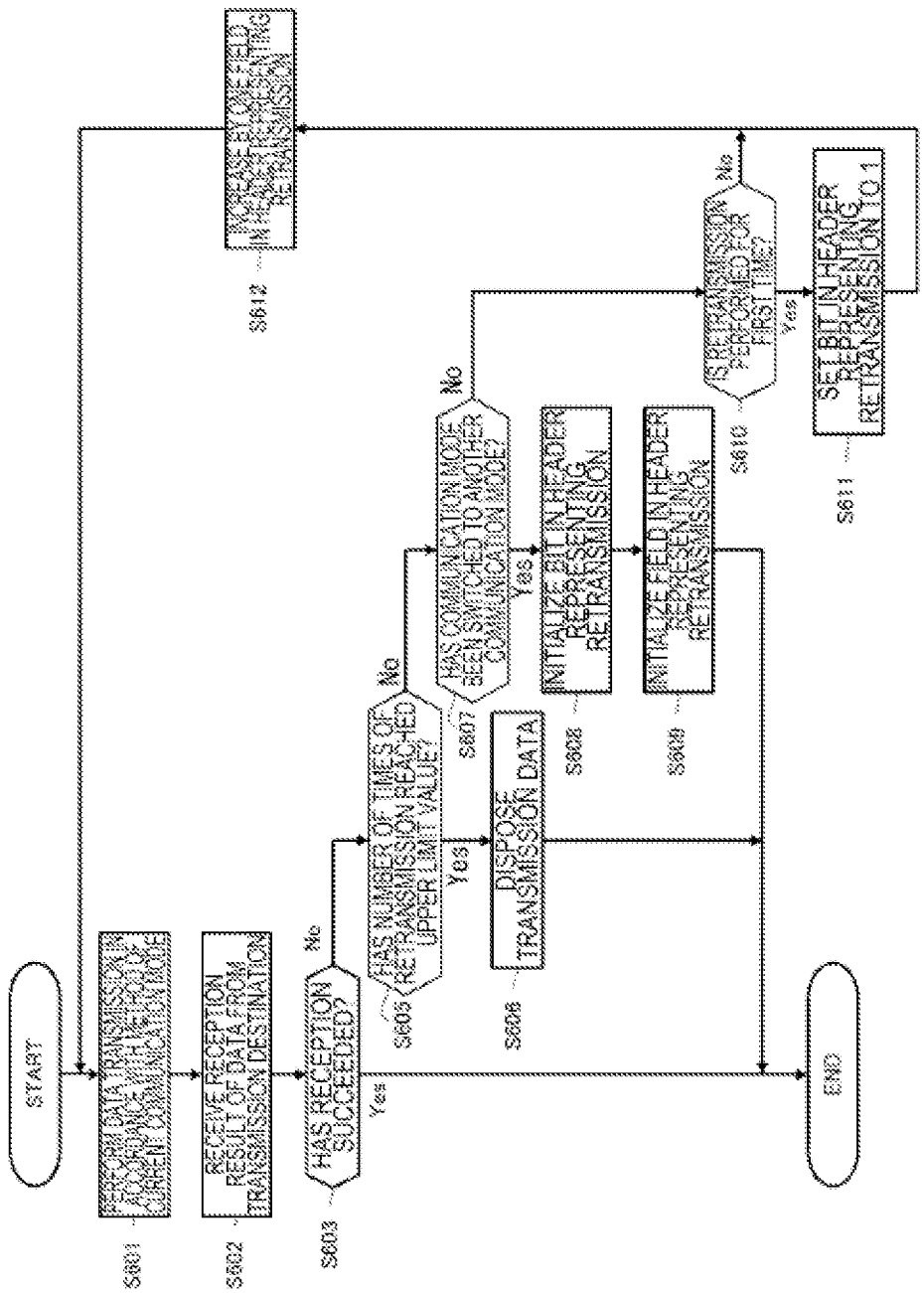
[Fig. 6]

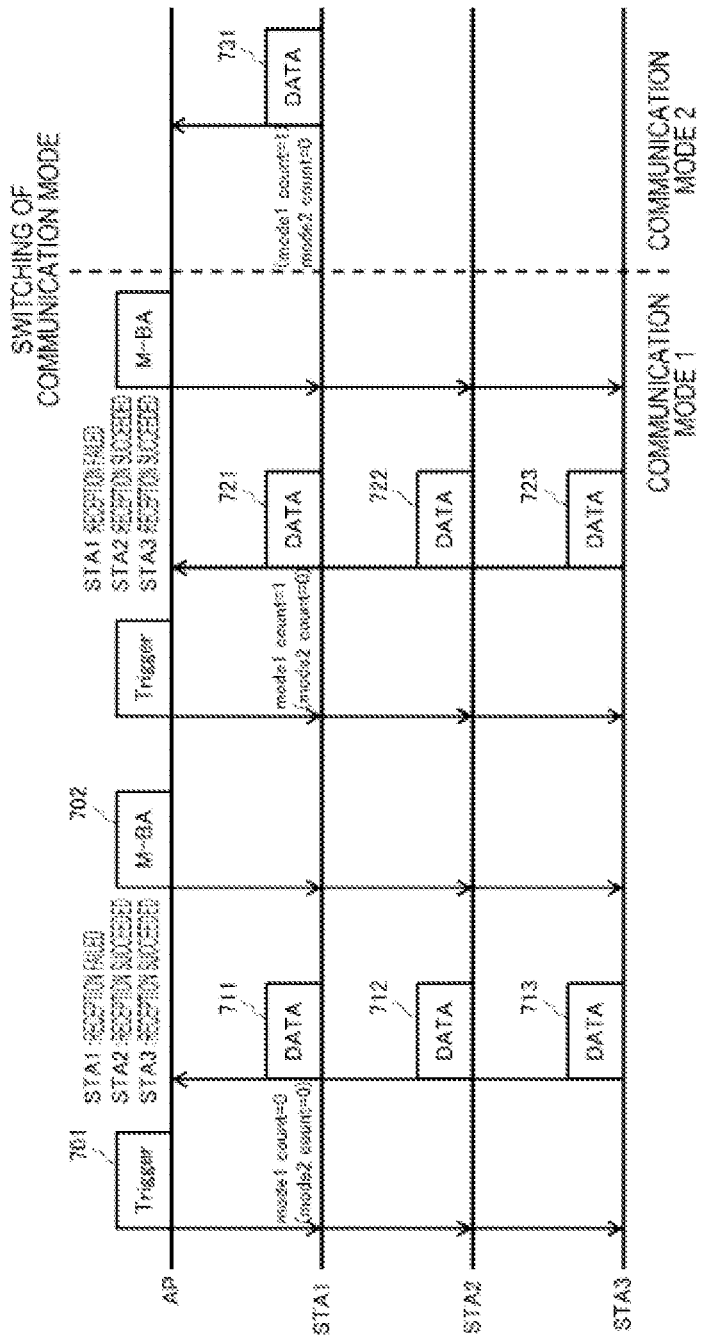
[Fig. 7]

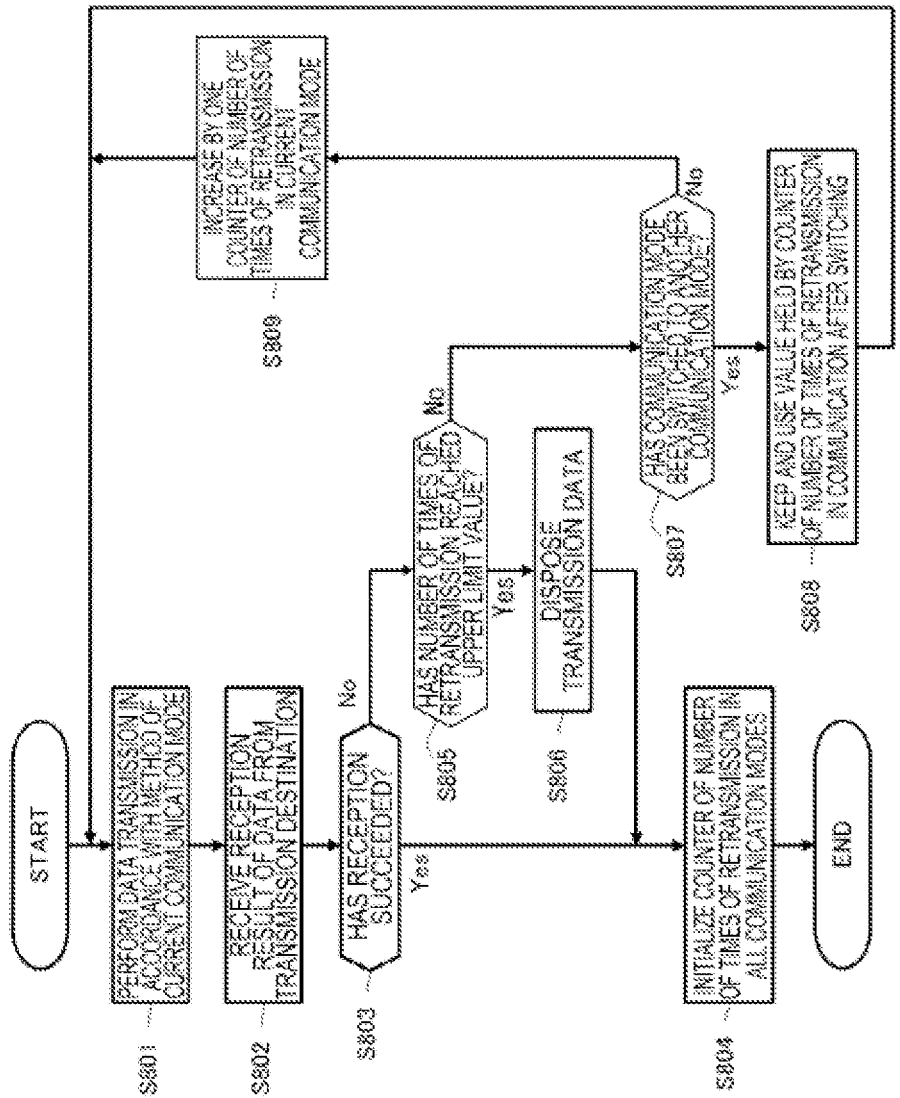

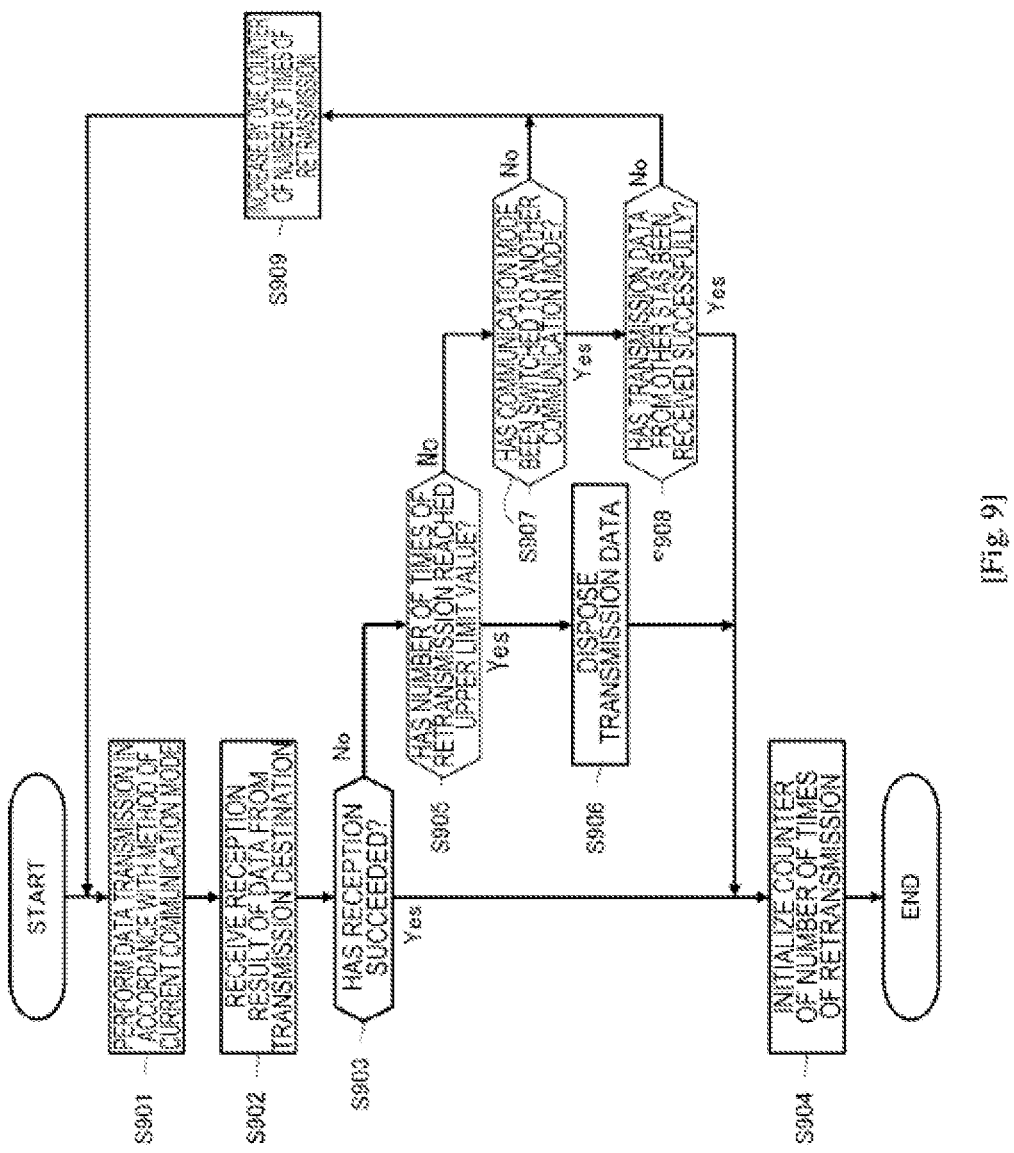
[Fig. 9]

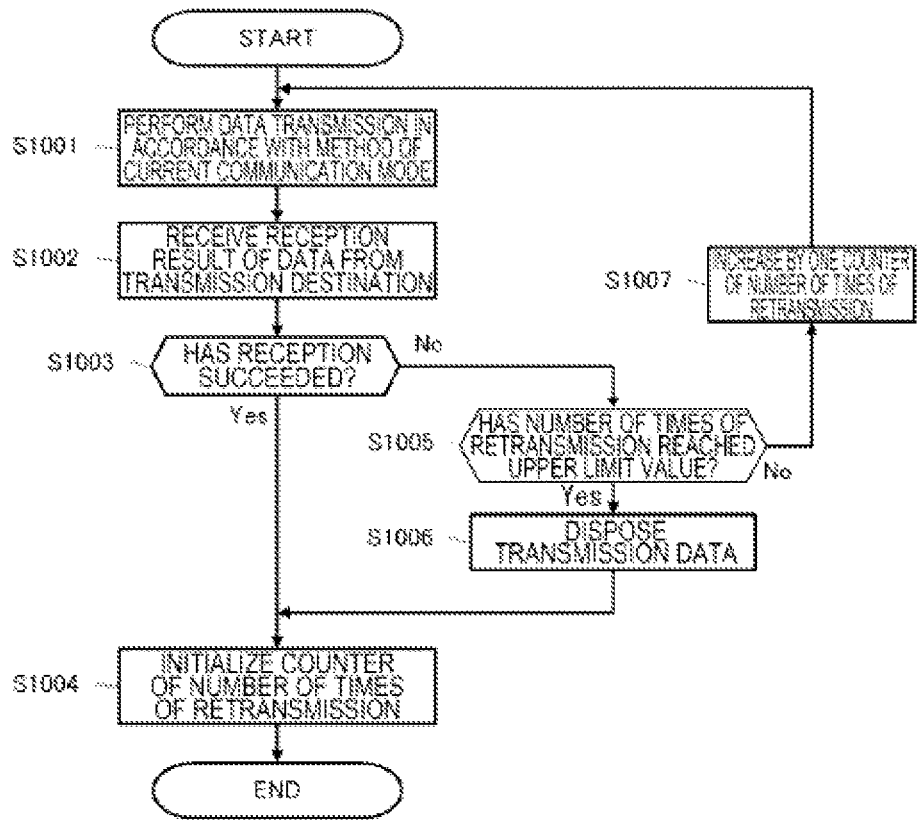
[Fig. 10]

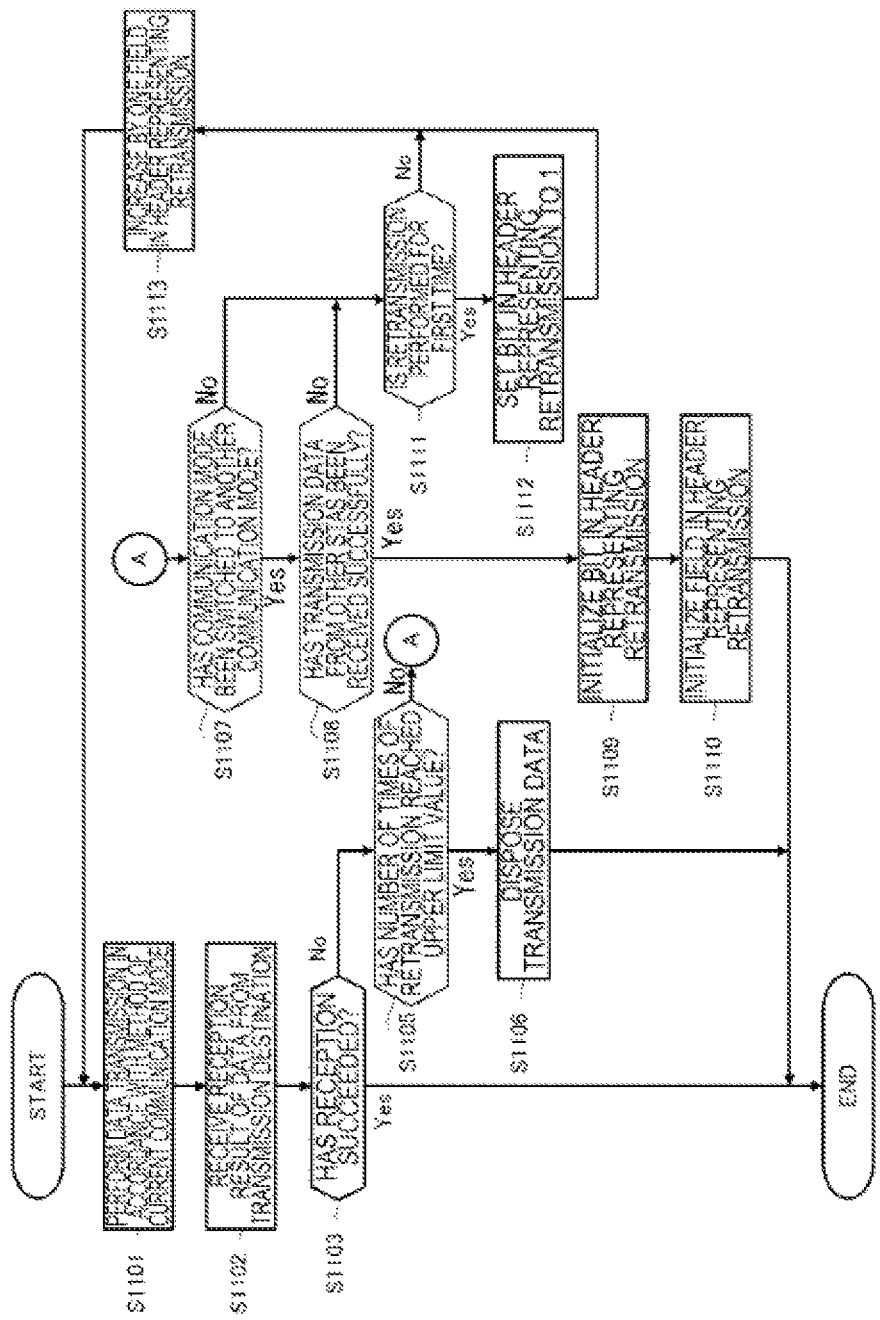
[Fig. 11]

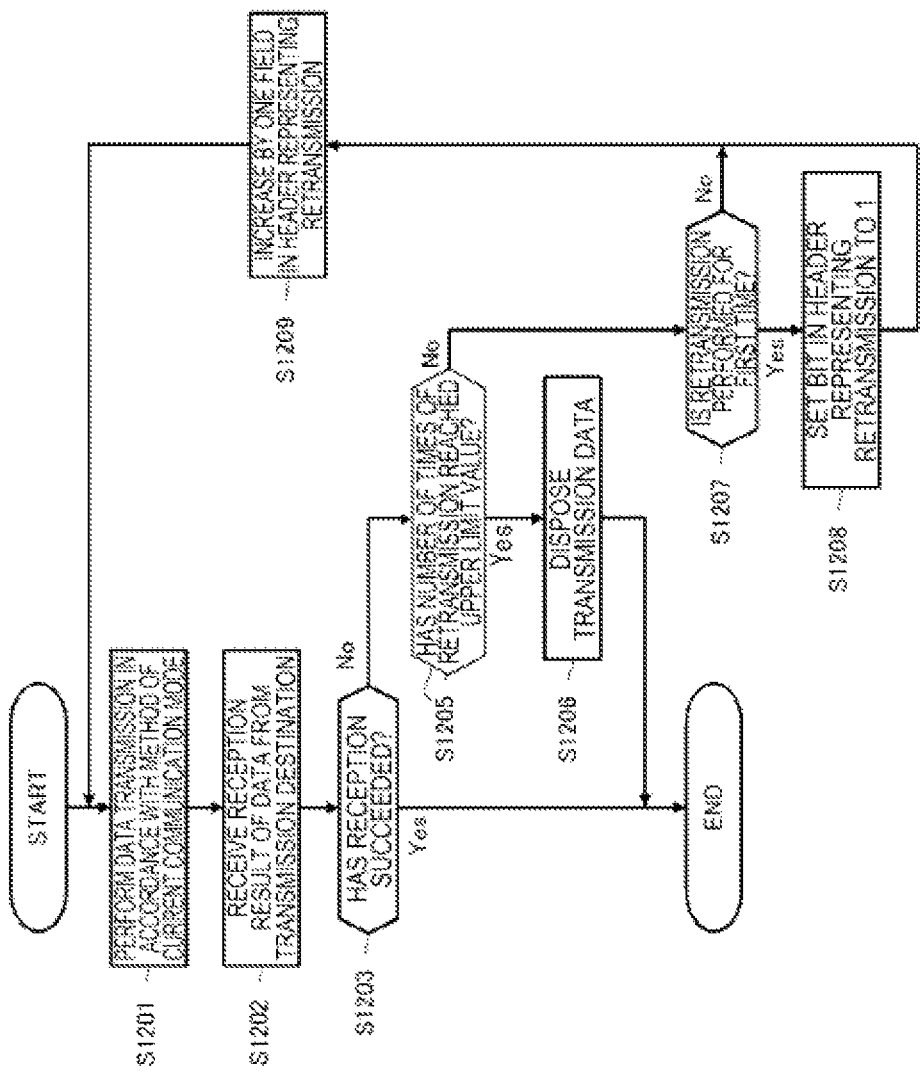

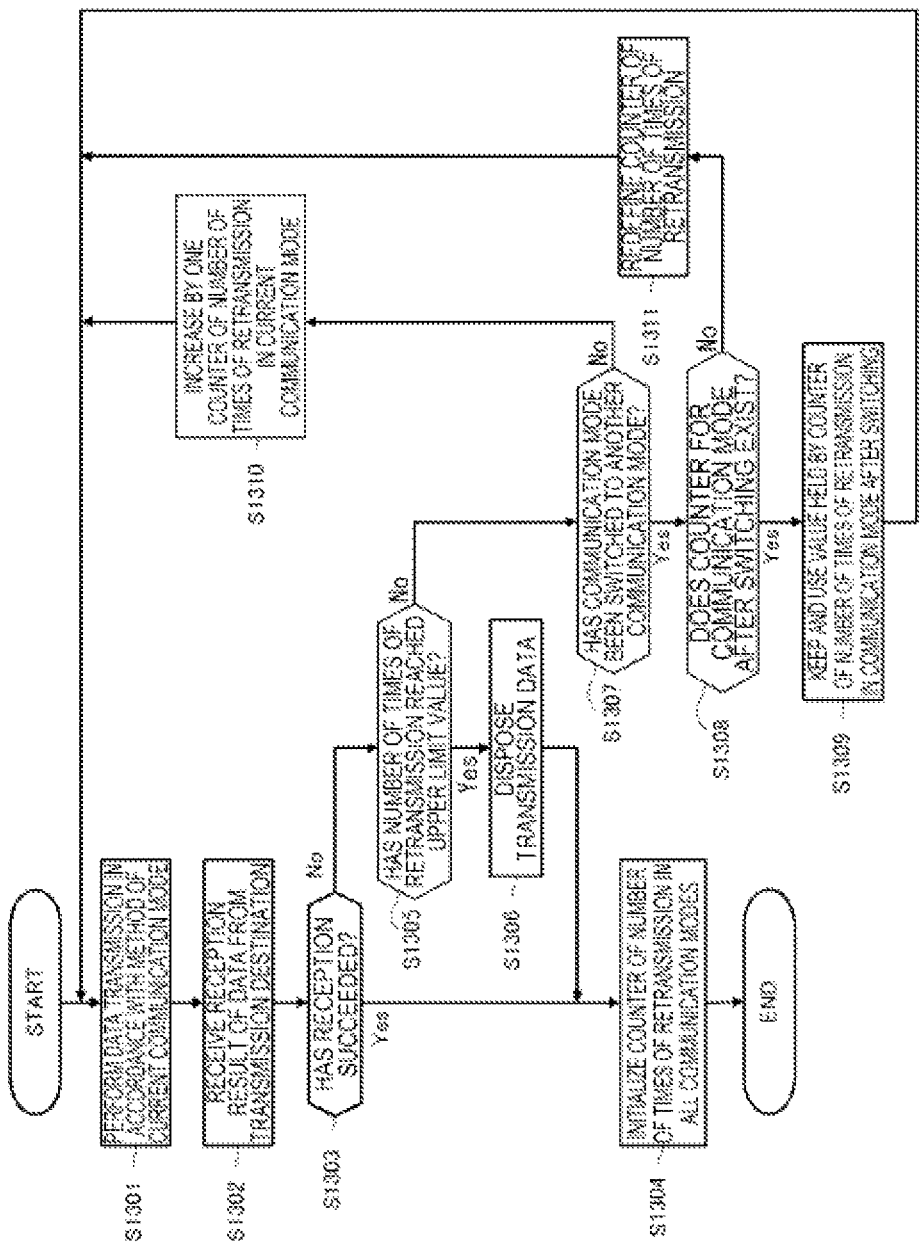

COMMUNICATION DEVICE AND COMMUNICATION METHOD

CROSS-REFERENCE TO RELATED APPLICATIONS

This application is a National Stage Application based on PCT/JP2017/029896 filed 22 Aug. 2017, claims the benefit of Japanese Priority Patent Application JP 2016-172432, filed Sep. 5, 2016, the entire contents of which are incorporated herein by reference.

TECHNICAL FIELD

The technology disclosed in the present specification relates to a communication device and a communication method operating in a plurality of communication modes.

BACKGROUND ART

In the autonomous distributed wireless system, each communication terminal has a mechanism for avoiding collision in data transmission, achieving communication in the state where a plurality of independent wireless terminals exist. For example, the wireless local area network (LAN) has a collision avoidance mechanism, referred to as enhanced distributed collision avoidance (EDCA), that sets random waiting time for collision avoidance in accordance with a data priority (see PTL 1, for example).

Meanwhile, in the centralized wireless communication system, a base station collectively controls data transmission of each terminal, achieving communication in the state where a plurality of independent wireless terminals exist. For example, IEEE802.11ax defines a mechanism for centralized communication in which a base station transmits trigger frames containing information such as a transmission resource to a plurality of wireless terminals under control and the wireless terminals perform in response uplink multiplex transmission.

CITATION LIST

Patent Literature

PTL 1: JP 2006-121561A
PTL 2: JP 5437307B

SUMMARY

Technical Problem

The technology disclosed in the present specification aims at providing an excellent communication device and communication method capable of operating preferably in a plurality of communication modes.

Solution to Problem

The technology disclosed in the present specification has been achieved in view of the above problem, and a first aspect is to provide a communication device including circuitry configured to communicate with an access point according to a plurality of communication modes including at least a centralized communication mode and an autonomous distributed communication mode; transmit data according to a first mode of the plurality of modes; maintain a counter that indicates a number of times retransmission of the data has been performed according to the first mode; switch from performing communication according to the first mode to performing communication according to the second mode; initialize the counter in response to the switching; and retransmit the data according to the second mode upon initialization of the counter.

According to another aspect of the technology there is disclosed a communication device, including circuitry configured to communicate with an access point according to at least a first communication mode and a second communication mode; transmit data according to a first mode of the plurality of modes; maintain a counter that indicates a number of times retransmission of the data has been performed according to the first mode; and modify a field included in the data transmitted according to the first mode based on a value of the counter; and retransmit the data including the modified field.

According to another aspect of the technology there is disclosed a communication device, including circuitry configured to communicate with an access point according to a plurality of communication modes including at least a centralized communication mode and an autonomous distributed communication mode; transmit data according to the plurality of modes; and store information indicating a number of times retransmission of data has been performed in each of the plurality of modes.

According to another aspect of the technology there is disclosed a communication method including communicating with an access point according to a plurality of communication modes including at least a centralized communication mode and an autonomous distributed communication mode; transmitting data according to a first mode of the plurality of modes; maintaining a counter that indicates a number of times retransmission of the data has been performed according to the first mode; switching from performing communication according to the first mode to performing communication according to the second mode; initializing the counter in response to the switching; and retransmitting the data according to the second mode upon initialization of the counter.

According to another aspect of the technology there is disclosed a communication method including communicating with an access point according to at least a first communication mode and a second communication mode; transmitting data according to a first mode of the plurality of modes; maintaining a counter that indicates a number of times retransmission of the data has been performed according to the first mode; modifying a field included in the data transmitted according to the first mode based on a value of the counter; and retransmitting the data including the modified field.

According to another aspect of the technology there is disclosed a communication method including communicating with an access point according to a plurality of communication modes including at least a centralized communication mode and an autonomous distributed communication mode; transmitting data according to the plurality of modes; and storing information indicating a number of times retransmission of data has been performed in each of the plurality of modes.

Advantageous Effects of Invention

The technology disclosed in the present specification can provide an excellent communication device and communication method capable of operating in a plurality of communication modes and preferably switching the communication modes.

Note that the effects described in the present specification are only examples, and the effects of the disclosure are not limited thereto. Moreover, the present disclosure may exert additional effects other than the above-described effects.

Other intention, features, and advantages of the technology disclosed in the present specification will become clear by more detailed description based on the later described embodiments and appended drawings.

BRIEF DESCRIPTION OF DRAWINGS

FIG. 1 is an explanatory diagram illustrating a configuration example of a communication system to which the technology disclosed in the present specification can be applied.

FIG. 2 is an explanatory block diagram illustrating a functional configuration of a communication device 200.

FIG. 3 is an explanatory diagram illustrating an example of a communication sequence between a base station and a terminal that is performed in a communication system (first embodiment).

FIG. 4 is an explanatory flowchart illustrating a processing procedure by a communication device for controlling information related to retransmission of data (first embodiment).

FIG. 5 is an explanatory diagram illustrating an example of a communication sequence between a base station and a terminal that is performed in a communication system (second embodiment).

FIG. 6 is an explanatory flowchart illustrating a processing procedure by a communication device for controlling information related to retransmission of data (second embodiment).

FIG. 7 is an explanatory diagram illustrating an example of a communication sequence between a base station and a terminal that is performed in a communication system (third embodiment).

FIG. 8 is an explanatory flowchart illustrating a processing procedure by a communication device for controlling information related to retransmission of data (third embodiment).

FIG. 9 is an explanatory flowchart illustrating another processing procedure by a communication device for controlling information related to retransmission of data (first embodiment).

FIG. 10 is an explanatory flowchart illustrating still another processing procedure by a communication device for controlling information related to retransmission of data (first embodiment).

FIG. 11 is an explanatory flowchart illustrating still another processing procedure by a communication device for controlling information related to retransmission of data (second embodiment).

FIG. 12 is an explanatory flowchart illustrating still another processing procedure by a communication device for controlling information related to retransmission of data (second embodiment).

FIG. 13 is an explanatory flowchart illustrating still another processing procedure by a communication device for controlling information related to retransmission of data (third embodiment).

DESCRIPTION OF EMBODIMENTS

Hereinafter, preferred embodiments of the technology disclosed in the present specification will be described with reference to the appended drawings.

It is assumed that one communication system has both a communication mode using a mechanism for autonomous distributed wireless communication and a communication mode using a mechanism for a centralized wireless communication, as in the above-described wireless LAN, for example. The former communication mode includes, for example, an EDCA mode in which each terminal operates in an autonomous and distributed manner to randomly access media using a collision avoidance mechanism such as an EDCA. The latter communication mode includes, for example, an uplink multiuser multiplex transmission mode in which a plurality of terminals transmit data under control of a base station. Moreover, there is assumed system operation in which communication modes are switched appropriately in accordance with communication environments and a data amount.

When the communication modes are switched in a communication system, it is necessary to reflect a communication parameter set as a result of communication in a communication mode before switching in a communication parameter in a communication mode after switching. However, the communication system is essentially different between the autonomous distributed wireless communication system and the centralized wireless communication system, and thus the simple transfer of the same communication parameter may be inappropriate.

For example, the failure of data communication in the EDCA mode of wireless LAN is more likely to be caused by collision with other pieces of data. Meanwhile, in the uplink multiuser multiplex mode, each terminal transmits data at timing controlled by a base station. Thus, the failure of data communication is less likely to be caused by collision with other pieces of data, and is more likely to be caused by deterioration of a signal interference noise ratio (SINR) and the like due to analog nonlinearity and signal distortion in a reception terminal. Therefore, the applicant considers that it is preferable to avoid the case in which the parameter set as a result of communication failure is simply taken over when the communication modes are switched.

For example, there are proposed a system and a method in which when a plurality of terminals perform uplink multiplex transmission of data to a base station and the communication of data from a part of the terminals has failed in a communication mode using the mechanism of centralized wireless communication, the part of the terminals sets, in the subsequent communication mode using the mechanism of autonomous distributed communication, waiting time for avoiding collision considering that the last communication has succeeded (see PTL 2, for example). This method avoids a problem of increasing unnecessary waiting time due to increase of waiting time for collision avoidance, which does not exert any effect for improvement when the communication failure in the communication mode using the mechanism of centralized wireless communication is not caused by collision with other pieces of data. However, the control of the parameter related to data retransmission is not considered. Thus, when the recovery of the data whose transmission has failed is performed by retransmission of the data, it is not possible to achieve appropriate data retransmission in accordance with a communication failure factor. For example, with an inappropriate upper limit value of the number of times of retransmission, data may be destroyed inappropriately.

Then, the present specification will describe in detail a method of appropriately controlling a parameter related to retransmission of data when the communication modes are switched in a communication system with a plurality of communication modes. The technology disclosed in the present specification initializes, in switching to another communication mode, the count of the number of times of retransmission of data retransmitted after communication has failed in one communication mode. Moreover, the technology disclosed in the present specification initializes, when data to be transmitted (a header, for example) contains a bit that notifies retransmission or a field that notifies the number of times of retransmission, the notification by switching the communication modes. In addition, the technology disclosed in the present specification controls the count of the number of times of retransmission independently for each communication mode.

FIG. 1 illustrates a configuration example of a communication system to which the technology disclosed in the present specification can be applied. The communication system in FIG. 1 includes a plurality of communication devices (STA1 to STA3, . . . , STAn) connected to one communication device (STA0). Here, the STA0 is a base station (AP), and the STA1 to STA3, . . . , STAn are terminals (STA). Note that the number of terminals is one example, and the communication system may include two or fewer terminals or four or more terminals.

FIG. 2 illustrates a functional configuration of the communication device 200 operating in the communication system of FIG. 1. It should be understood that the base station (AP) and the terminal (STA) have the same basic configuration.

The communication device 200 includes a data processing unit 201, a control unit 202, a communication unit 203, and a power source unit 204. The communication unit 203 further includes a modulation and demodulation unit 211, a space signal processing unit 212, a channel estimation unit 213, a wireless interface (IF) unit 214, an amplifier unit 215, and an antenna 216. A set of the wireless interface unit 214, the amplifier unit 215, and the antenna 216 form one transmission and reception branch, and a plurality (n pieces) of transmission and reception branches may be provided, as illustrated in FIG. 2. Note that the function of the amplifier unit 215 may be included in the wireless interface unit 214.

It is premised in the embodiment that the communication unit 203 can perform wireless communication in a plurality of communication modes. The communication modes here can include a centralized communication mode in which uplink multiuser multiplex transmission is performed under control of the base station, and an autonomous distributed communication mode in which media is randomly accessed using a collision avoidance mechanism such as an EDCA.

The data processing unit 201 generates, in transmission at which data is input from a communication protocol upper layer (not illustrated), a packet for wireless transmission on the basis of the data, performs processing such as addition of a media access control (MAC) header for MAC or addition of an error detecting code, and provides the processed data to the modulation and demodulation unit 211. On the other hand, the data processing unit 201 performs, in reception at which data is input from the modulation and demodulation unit 211, processing such as analysis of the MAC header, detection of a packet error, and packet reordering, and provides the processed data to the protocol upper layer of the data processing unit 201 itself.

The control unit 202 receives and transfers information between the units in the communication device 200. The control unit 202 sets parameters for the modulation and demodulation unit 211 and the space signal processing unit 212 in the communication unit 203, and schedules packets in the data processing unit 201. Moreover, the control unit 202 sets parameters for the wireless interface unit 214 and the amplifier unit 215 in the communication unit 203, and controls transmission power.

Especially in the technology disclosed in the present specification, the control unit 202 controls switching of different communication modes, and controls each unit so as to set parameters in switching of the communication modes. In addition, the control unit 202 initializes the count of the number of times of retransmission in switching of communication modes, initializes additional information related to retransmission of data to be transmitted, or controls each unit so as to count the number of times of retransmission independently for each communication mode.

The modulation and demodulation unit 211 performs, in transmission, encoding, interleaving, and modulation processing on input data from the data processing unit 201 on the basis of the coding and the modulation system set by the control unit 202, generates a data symbol stream, and provides it to the space signal processing unit 212. Moreover, the modulation and demodulation unit 211 performs, in reception, demodulation processing, deinterleaving, and decoding, reversely to the time of transmission, on the input from the space signal processing unit 212, and provides the data to the data processing unit 201 or the control unit 202.

The space signal processing unit 212 performs, in transmission, signal processing for space separating data input from the modulation and demodulation unit 211 if necessary, and provides the obtained one or more transmission symbol streams to the corresponding wireless interface unit 213. Moreover, the space signal processing unit 212, in reception, performs signal processing on the reception symbol stream input from the corresponding wireless interface unit 214, and performs space separation of the stream if necessary before providing it to the modulation and demodulation unit 211.

The channel estimation unit 213 calculates complex channel gain information of a propagation path on the basis of a preamble part and a training signal part of input signals from the wireless interface unit 214. The calculated complex channel gain information is used for modulation and demodulation processing at the modulation and demodulation unit 211, and space processing at the space signal processing unit 212 through the controller 292.

The wireless interface unit 214 converts, in transmission, the input from the space signal processing unit 212 into analog signals, performs filtering and up-converting to a carrier frequency, and transmits them to the antenna 216 and the amplifier unit 215. On the other hand, the wireless interface unit 214 performs, in reception, down-converting to a base band frequency and converting processing to digital signals on the input from the antenna 216 and the amplifier unit 215, and provides the data to the space signal processing unit 212 and the channel estimation unit 213.

The amplifier unit 215 amplifies, in transmission, the analog signals input from the wireless interface unit 214 to given power, and transmits them to the antenna 216. On the other hand, the amplifier unit 215 applies, in reception, low noise amplification to given power on the signals input from the antenna 216, and outputs them to the wireless interface unit 214. Regarding the amplifier unit 215, at least one of the function in transmission and the function in reception may be included in the wireless interface unit 214.

The power source unit 204 includes a battery power source or a fixed power source (a commercial power supply, etc.), and supplies power to each unit of the communication device 200.

The following will describe an embodiment of a communication system to which the technology disclosed in the present specification is applied.

First Embodiment

In the first embodiment, a communication device operating as an STA initializes the inner counter for counting the number of times of retransmission of data in switching of communication modes. The following will describe a concrete method of resetting the count of the number of times of retransmission in switching of communication modes, on the basis of transmission results of the terminal itself and other terminals having performed multiuser multiplex transmission at the same time.

FIG. 3 illustrates an example of a communication sequence between a base station (AP) and terminals (STA) that is performed in a communication system. In FIG. 3, each square represents a frame, and arrows represent transmission directions (upward arrow represents an uplink, downward arrow represents a downlink) A frame with a notation of Trigger is a trigger frame, and a frame with a notation of DATA is a data frame. The horizontal axis represents time, and the frames transmitted at the same time represent those of multiuser multiplex transmission.

First, it is assumed that the communication system is in a communication mode 1. The communication mode 1 is a centralized wireless communication mode such as an uplink multiuser multiplex mode, for example, in which each STA transmits data at timing controlled by the AP.

The AP transmits a trigger frame 301 to the STA1 to 3 under control in a format that can be received by a plurality of STAs. The trigger frame 301 contains permission of data transmission for each STA, a traffic allowing transmission, a frequency resource, and a space resource, transmission power, a modulation and coding scheme, and other parameters that are used in transmission.

The STA receives the trigger frame 301, and transmits, once data transmission is permitted, a data frame by a specified method. Here, a plurality of STAs may perform uplink multiplex transmission. FIG. 3 illustrates an example in which the STAs 1 to 3 perform uplink multiplex transmission. Data frames 311 to 313 transmitted here are not retransmitted data frames but data frames transmitted for the first time. Here, each of the STAs 1 to 3 sets the inner counter of the number of times of retransmission regarding each data to 0 (that is, counter=0).

Next, it is assumed that the AP has failed in receiving the data frame 311 transmitted by the STA1, while the AP has successfully received the data 312, 313 transmitted by the STA2 and the STA3. The AP transmits a multi STA block ack (M-BA) frame 302 in a format that can be received by a plurality of STAs, or transmits a block ack (BA) frame (not illustrated) to each STA by downlink multiplex transmission or a plurality of times of single user transmission, thereby notifying each STA of the reception result.

Notified of the reception result by the AP, each STA prepares for transmission of the next new data when the reception of the data frame has succeeded, while it prepares for retransmission of the data when the reception of the data frame has failed. In the example of FIG. 3, the AP has failed in receiving the data frame 311 transmitted from the STA1, and the STA1 prepares for transmission of a retransmission data frame 321.

Here, the STA1 sets the inner counter of the number of times of retransmission regarding the data to 1 (that is, counter=1). Thereafter, every time the retransmission is repeated, the STA1 increases the counter of the number of times of retransmission one by one to 2, 3 for setting.

By contrast, the data frames 312, 313 transmitted from the STA2 and the STA3 are received successfully. Thus, each of the STA2 and the STA3 prepares transmission of the next new data frames 322, 323. Here, each of the STA2 and the STA3 sets the inner counter of the number of times of retransmission to 0.

Subsequently, there are repeatedly performed transmission of trigger frames from the AP, transmission or retransmission of data from each STA permitted to transmit data, and notification of reception results through M-BA frames and the like from the AP.

Here, it is assumed that the STA1 performs retransmission, and then the communication mode 1 has been switched to the communication mode 2 in the communication system before the AP succeeds in reception or before the counter of the number of times of retransmission reaches a predetermined upper limit value so that the data is disposed. The communication mode 2 is an autonomous distributed wireless communication mode such as an EDCA mode, for example, and the STA transmits data at timing when other STAs are not transmitting data after random waiting time has elapsed.

Here, when the STA1 retransmits, for the first time after the communication mode is switched to the communication mode 2, a data frame 331 whose transmission has failed in the communication mode 1, the STA1 initializes the inner counter of the number of times of retransmission regarding the data from a value set in the communication mode 1 to 0 (that is, count=0). The STA2 and the STA3 also initialize the counter of the number of times of retransmission in the same manner.

That is, the STA1 in the embodiment defines, as the condition for initializing the counter of the number of times of retransmission, the time of switching communication modes, in addition to general conditions such as the time of normally receiving retransmission data and the time of reaching an upper limit of the number of times of retransmission.

Moreover, whether the initialization at the time of switching communication modes is performed may be determined in accordance with reception results of data frames of other STAs. For example, the initialization of the counter of the number of times of retransmission may be performed only in the case where at least one or more data frames of other STAs has been received successfully. When the success in reception of data frames of other STAs is added to the condition for initialization, it is possible to determine more securely that the failure in reception of the own data frame has not been caused by collision with a frame of the third party. Each STA can detect reception results of data frames of other STAs on the basis of information stored in an M-BA from the AP, for example. Note that the value set as a result of initialization is not limited to 0, and may be a predetermined numerical value or a numerical value found by arithmetic operation on a value of the counter of the number of times of retransmission immediately before initialization.

Although the illustration is omitted, the counter of the number of times of retransmission of each STA is initialized to 0 also when the communication mode 2 is switched to the communication mode 1 in the communication system. It is natural that whether the initializations is performed may be determined in accordance with reception results of data frames of other STAs also when the communication mode 2 is switched to the communication mode 1. The value set as a result of initialization is not limited to 0, and may be a predetermined numerical value or a numerical value found by arithmetic operation on a value of the counter of the number of times of retransmission immediately before initialization.

Moreover, the switching of communication modes in the communication system may be performed spontaneously by the STA, or may be specified explicitly by the AP and performed at timing known preliminarily.

In the embodiment, the following effects are exerted by the operation of the STA for resetting the number of times of retransmission in switching of communication modes.

The factor for failure in data reception may be essentially different between communication modes. Therefore, the applicant considers that the recovery by retransmission is preferably performed independently in each communication mode. However, if the STA takes over, when the communication mode in the communication system has been switched after the STA performs a number of times of retransmission, the counter of the number of times of retransmission in a communication mode before switching, the retransmission in a communication mode after switching reaches an upper limit value earlier than usual so that the data is disposed. Meanwhile, in the embodiment, the STA initializes the counter of the number of times of retransmission in switching of communication modes, whereby it is possible to achieve recovery by retransmission independently performed in each communication mode and prevent inappropriate disposal of data.

FIG. 4 illustrates, in the form of a flowchart, a processing procedure by the communication device of the embodiment for controlling information related to retransmission of data. The flowchart in FIG. 4 assumes the processing in the communication device operating as an STA. The communication device includes therein a counter of the number of times of retransmission of each transmission data, and defines, as the condition for initializing the counter, the time of receiving retransmission data normally, the time of reaching an upper limit of the number of times of retransmission, and the time of switching communication modes.

First, the communication device performs data transmission in accordance with a current communication mode of the communication system (Step S401), and receives a data reception result from a data transmission destination (Step S402). In general, the data transmission destination transmits as a reply a data reception result in the form of an ack frame. Moreover, in the case of the multiuser multiplex mode, the AP transmits as a reply an M-BA frame, or a BA frame by downlink multiplex transmission or a plurality of times of single user transmission. Then, the communication device checks whether the data transmission destination has succeeded in reception (Step S403).

Here, when the data transmission destination has succeeded in reception (Yes at Step S403), the communication device initializes the inner counter of the number of times of retransmission regarding the data (Step S404). However, the value set as a result of initialization is not limited to 0, and may be a predetermined numerical value or a numerical value found by arithmetic operation on a value of the counter of the number of times of retransmission immediately before initialization.

By contrast, when the data transmission destination has failed in reception (No at Step S403), the communication device checks whether the counter of the number of times of retransmission regarding the data has reached an upper limit value (Step S405).

When the number of times of retransmission of the data has reached the upper limit value (Yes at Step S405), the communication device disposes the transmission data (Step S406), and initializes the counter of the number of times of retransmission (Step S404).

Further, when the number of times of retransmission has not reached the upper limit value (No at Step S405), the communication device checks whether the communication mode of the communication system in which the communication device currently performs communication operation has been switched to another communication mode, that is, whether the communication mode has been switched to another communication mode before the data transmission destination succeeds in reception or before the counter of the number of times of retransmission reaches the predetermined upper limit value so that the data is disposed (Step S407).

When the communication mode has not been switched (No at Step S407), the communication device increases by one the counter of the number of times of retransmission regarding the data (Step S408) before returning to Step S401 to retransmit the data.

By contrast, when the communication mode has been switched to another communication mode before the data transmission destination succeeds in reception or before the counter of the number of times of retransmission reaches the predetermined upper limit value so that the data is disposed (Yes at Step S407), the communication device initializes the inner counter of the number of times of retransmission regarding the data (Step S404). In this manner, the communication device can achieve recovery by retransmission independently performed in each communication mode, preventing inappropriate disposal of data.

FIG. 9 illustrates, in the form of a flowchart, another processing procedure by the communication device of the embodiment for controlling information related to retransmission of data. The flowchart in FIG. 9 assumes the processing in the communication device operating as an STA. This processing procedure is different from the processing procedure illustrated in FIG. 4 in that the success in reception of (at least one piece of) transmission data from other STAs is added as the condition for initializing the counter by the communication device in switching of communication modes.

First, the communication device performs data transmission in accordance with a current communication mode of the communication system (Step S901), and receives a data reception result from a data transmission destination (Step S902).

Then, the communication device checks whether the data transmission destination has succeeded in reception (Step S903). Here, it is preferable that the communication device also checks whether the transmission data from other STAs has been received successfully. In the case of the multiuser multiplex mode, for example, the communication device analyzes the content of an M-BA frame transmitted as a reply from the AP, or the content of a BA frame transmitted by downlink multiplex transmission or a plurality of times of single user transmission, and detects reception results of transmission data from other STAs.

Here, when the data transmitted by the communication device itself has been received successfully (Yes at Step S903), the communication device initializes the inner counter of the number of times of retransmission regarding the data (Step S904).

By contrast, when the data transmission destination has failed in reception (No at Step S903), the communication device checks whether the counter of the number of times of retransmission regarding the data has reached an upper limit value (Step S905). When the number of times of retransmission of the data has reached the upper limit value (Yes at Step S905), the communication device disposes the transmission data (Step S906), and initializes the counter of the number of times of retransmission regarding the data (Step S904).

Moreover, when the number of times of retransmission of the data has not reached the upper limit value (No at Step S905), the communication device checks whether the communication mode of the communication system has been switched to another communication mode (Step S907). When the communication mode has not been switched (No at Step S907), the communication device increases by one the counter of the number of times of retransmission regarding the data (Step S909) before returning to Step S901 to retransmit the data.

By contrast, when the communication mode has been switched to another communication mode before the data transmission destination succeeds in reception or before the counter of the number of times of retransmission reaches the predetermined upper limit value so that the data is disposed (Yes at Step S907), the communication device further checks whether (at least one piece of) the transmission data from other STAs has been received successfully (Step S908).

When the reception of the transmission data from other STAs has also failed (No at Step 908), the communication device does not initialize the counter, and increases by one the counter of the number of times of retransmission regarding the data (Step S909) before returning to Step S901 to retransmit the data.

Further, when (at least one piece of) transmission data from other STAs has been received successfully (Yes at Step 908), the communication device initializes the inner counter of the number of times of retransmission regarding the data in the communication device (Step S904).

Further, FIG. 10 illustrates still another processing procedure by the communication device of the embodiment for controlling information related to retransmission of data. The flowchart in FIG. 10 assumes the processing in the communication device operating as an STA. In this processing procedure, the communication device defines, as the condition for initializing the counter of the number of times of retransmission, only the time of normally receiving transmission data and the time of reaching an upper limit of the number of times of retransmission. That is, the communication device does not initialize the counter in switching of communication modes, and takes over the counter in a communication mode before switching.

First, the communication device performs data transmission in accordance with a current communication mode of the communication system (Step S1001), and receives a data reception result from a data transmission destination (Step S1002). Then, the communication device checks whether the data transmission destination has succeeded in reception (Step S1003).

Here, when the data transmitted by the communication device itself has been received successfully (Yes at Step S1003), the communication device initializes the inner counter of the number of times of retransmission regarding the data (Step S1004).

By contrast, when the data transmission destination has failed in reception (No at Step S903), the communication device further checks whether the counter of the number of times of retransmission regarding the data has reached an upper limit value (Step S1005). When the number of times of retransmission of the data has reached the upper limit value (Yes at Step S1005), the communication device disposes the transmission data (Step S1006), and initializes the counter of the number of times of retransmission (Step S1004).

Further, when the number of times of retransmission has not reached the upper limit value (No at Step S1005), the communication device increases by one the counter of the number of times of retransmission regarding the data regardless of whether the communication mode of the communication system has been switched to another communication mode (Step S1007) before returning to Step S1001 to retransmit the data.

Second Embodiment

In the second embodiment, a communication device operating as an STA initializes, when data to be transmitted (a header, for example) contains a bit that notifies retransmission or a field that notifies the number of times of retransmission, the notification in switching of communication modes. It is premised in the second embodiment that the communication device controls the inner counter for counting the number of times of retransmission of data and initializes the counter when the communication modes are switched, similarly to the above-described first embodiment.

The following will describe a concrete method of resetting, in switching of communication modes, retransmission information notification as additional information of data to be transmitted (e.g., information in a header) on the basis of transmission results of the terminal itself and other terminals having performed multiuser multiplex transmission at the same time.

FIG. 5 illustrates an example of a communication sequence between a base station (AP) and terminals (STA) that is performed in a communication system in the embodiment. In FIG. 5, each square represents a frame, and arrows represent transmission directions (upward arrow represents an uplink, downward arrow represents a downlink) A frame with a notation of Trigger is a trigger frame, and a frame with a notation of DATA is a data frame. Moreover, the horizontal axis represents time, and the frames transmitted at the same time represent those of multiuser multiplex transmission. Moreover, a square further added in a head of a data frame represents a header of the frame. However, to simplify the drawing, the header is illustrated only for a part of the data frames.

First, it is assumed that the communication system is in a communication mode 1. For example, the communication mode 1 is a centralized wireless communication mode such as an uplink multiuser multiplex mode, for example, in which each STA transmits data at timing controlled by the AP.

The AP transmits a trigger frame 501 in a format that can be received by a plurality of STAs. The trigger frame 501 contains permission of data transmission for each STA, a traffic allowing transmission, a frequency resource, and a space resource, transmission power, a modulation and coding scheme, and other parameters that are used in transmission.

The STA receives the trigger frame 501, and transmits, once data transmission is permitted, data by a specified method. Here, a plurality of STAs may perform uplink multiplex transmission. FIG. 5 illustrates an example in which the STAs 1 to 3 perform uplink multiplex transmission. Data frames 511 to 513 transmitted here are not retransmitted data frames but data frames transmitted for the first time. Here, the STA1 to 3 set a bit in the header of the data frames 511 to 513 representing whether the frame is a retransmitted frame to 0 (that is, retry=No). Moreover, when the header contains a field representing the number of times of retransmission of the frame, it is set to 0 (that is, count=0).

Next, it is assumed that the AP has failed in receiving the data frame 511 transmitted by the STA1, while the AP has successfully received the data frames 512, 513 transmitted by the STA2 and the STA3. The AP transmits, an M-BA frame 502 in a format that can be received by a plurality of STAs or transmits a BA frame (not illustrated) to each STA by downlink multiplex transmission or a plurality of times of single user transmission so as to notify each STA of the reception result.

Notified of the reception result by the AP, each STA prepares for transmission of the next new data when the reception of the data frame has succeeded, while it prepares for retransmission of the data when the reception of the data frame has failed. In the example of FIG. 5, the AP has failed in receiving the data 511 transmitted from the STA1, and the STA1 prepares for retransmission of a retransmission data frame 521.

Here, the STA1 sets a bit in the header added to the frame 521 representing whether the frame is a retransmitted frame to 1 (that is, retry=Yes). Moreover, when the header contains a field representing the number of times of retransmission of the frame, it is set to 1 (that is, count=1). Thereafter, every time the retransmission is repeated, the STA1 keeps 1 for the bit in the header of the retransmission data frame and increases one by one the value of the field to 2, 3 for setting.

By contrast, the data frames 512, 513 transmitted from the STA2 and the STA3 are received successfully. Thus, the STA2 and the STA3 prepare for transmission of the next new data frames 522, 523. Here, each of the STA2 and the STA3 sets a bit in the header of the data frames 522, 523 representing whether the frame is a retransmitted frame to 0 (that is, retry=No). Moreover, when the header contains a field representing the number of times of retransmission of the frame, it is set to 0 (that is, count=0).

Subsequently, there are repeatedly performed transmission of trigger frames from the AP, transmission or retransmission of data from each STA permitted to transmit data, and notification of reception results through M-BA frames and the like from the AP.

Here, it is assumed that the STA1 performs retransmission, and then the communication mode 1 has been switched to the communication mode 2 in the communication system before the AP succeeds in reception or before the counter of the number of times of retransmission reaches a predetermined upper limit value so that the data is disposed. For example, the communication mode 2 is an autonomous distributed wireless communication mode, and the STA transmits data at timing when other STAs are not transmitting data after random waiting time has elapsed.

Here, when the STA1 performs, for the first time after the communication mode has been switched to the communication mode 2, retransmission of data whose transmission has failed in the communication mode 1, a bit in the header of the data frame 531 representing whether the frame is a retransmitted frame is initialized to 0. Moreover, when a field representing how many times the retransmission data frame 531 has been retransmitted exists, the value is also initialized to 0. It is premised that the STA1 initializes the counter of the number of times of retransmission regarding the data in the STA1 from a value set in the communication mode 1 to 0. The STA2 and the STA3 also initialize the inner counter of the number of times of retransmission in the same manner.

That is, the STA1 in the embodiment defines, as the condition for initializing the bit in the header of the data frame representing whether the data frame is a retransmitted data frame or the field representing how many times the frame has been retransmitted, the time of switching of the communication modes, in addition to general conditions such as time of normally receiving retransmission data and time of reaching an upper limit of the number of times of retransmission.

Moreover, whether the initialization at the time of switching the communication modes is performed may be determined in accordance with reception results of data frames of other STAs. For example, the initialization of the counter of the number of times of retransmission may be performed only in the case where at least one or more data frames of other STAs has been received successfully. When the success in reception of the data frames of other STAs is added as the condition for initialization, it is possible to securely determine that the failure in reception of the own data frame has not been caused by collision with a frame of the third party. Each STA can detect reception results of data frames of other STAs on the basis of information stored in an M-BA from the AP, for example. Note that the value set as a result of initialization is not limited to 0, and may be a predetermined numerical value or a numerical value found by arithmetic operation on a value of the counter of the number of times of retransmission immediately before initialization.

Moreover, although the illustration is omitted, also in the case where the communication mode 2 has switched to the communication 1 in the communication system, each STA initializes a bit in a header of a data frame representing whether the frame is a retransmitted frame to 0 in the same manner. Moreover, when a field representing how many times the frame has been retransmitted exits, the value is also initialized to 0. It is natural that whether the initializations is performed may be determined in accordance with reception results of data frames of other STAs also when the communication mode 2 has been switched to the communication mode 1. The value set as a result of initialization is not limited to 0, and may be a predetermined numerical value or a numerical value found by arithmetic operation on a value of the counter of the number of times of retransmission immediately before initialization.

Moreover, the switching of the communication modes in the communication system may be performed spontaneously by the STA, or may be specified explicitly by the AP and performed at timing known preliminarily.

In the embodiment, the following effects are exerted by the action of the STA for resetting retransmission information notification as additional information (a header, etc.) of data transmitted in switching of communication modes.

The AP having received data can determines whether transmission is performed in the next trigger fame in accordance with information of a bit in a header of the frame representing whether the frame is a retransmitted frame or a field representing how many times the frame has been retransmitted. For example, the AP may preferentially transmit a frame that has been retransmitted a large number of times and thus has high possibility of being disposed.

In the above-described first embodiment, it is considered that the STA initializes the number of times of retransmission in accordance with a communication mode to increase the opportunity of retransmission. Thus, when the AP permits transmission through a trigger frame, for example, it is necessary to appropriately reflect the number of times of retransmission. In the embodiment, the STA resets retransmission information notification as additional information of data (initializes a bit and a field in a header related to retransmission) in switching of communication modes, whereby it is possible to prevent assignment of a high priority to a frame to which a high priority is not necessarily assigned and thus improve the communication efficiency.

FIG. 6 illustrates, in the form of a flowchart, a processing procedure by the communication device of the embodiment for controlling information related to retransmission of data. The flowchart in FIG. 6 assumes the communication operation of an STA. With the existent operation of the communication device operating as an AP, it is possible to exert the same effects as the embodiment. The communication device includes therein a counter of the number of times of retransmission regarding each transmission data, and defines, as the condition for initializing the counter, the time of receiving retransmission data normally, the time of reaching an upper limit of the number of times of retransmission, and the time of switching communication modes.

First, the communication device performs data transmission in accordance with a current communication mode of a communication system (Step S601), and receives a data reception result from a data transmission destination (Step S602). Then, the communication device checks whether the data transmission destination has succeeded in reception (Step S603). Here, when the data transmission destination has succeeded in reception (Yes at Step S603), the communication device initializes the inner counter of the number of times of retransmission regarding the data.

By contrast, when the data transmission destination has failed in reception (No at Step S603), the communication device checks whether the counter of the number of times of retransmission regarding the data has reached an upper limit value (Step S605). When the number of times of retransmission of the data has reached the upper limit value (Yes at Step S605), the communication device disposes the transmission data (Step S606), and initializes the inner counter of the number of times of retransmission regarding the data.

Moreover, when the number of times of retransmission has not reached the upper limit value (No at Step S605), the communication device checks whether a communication mode of the communication system in which the communication device currently performs communication operation has been switched to another communication mode, that is, whether the communication mode has been switched to another communication mode before the data transmission destination succeeds in reception before the counter of the number of times of retransmission reaches the predetermined upper limit value so that the data is disposed (Step S607).

When the communication mode has not been switched (No at Step S607), the communication device then checks whether the data is retransmitted for the first time (Step S610). When the data is retransmitted for the first time (Yes at Step S610), the communication device sets a bit in a header representing whether the frame is a retransmitted frame to 1 (Step S611). Then, the communication device increases by one a value of a field in the header representing the number of times of retransmission of the frame (Step S612) before returning to Step S601 to retransmit the data.

By contrast, when the communication mode has been switched to another communication mode before the data transmission destination succeeds in reception or before the counter of the number of times of retransmission reaches the predetermined upper limit value so that the data is disposed (Yes at Step S607), the communication device initializes the bit in the header representing whether the frame is a retransmitted frame (Step S608) and initializes the value of the field in the header representing the number of times of retransmission of the frame (Step S609). In this manner, the communication device can achieve recovery by retransmission independently performed for each communication mode, preventing inappropriate disposal of data.

The header referred to here corresponds to a MAC header added to a MAC frame, for example, and the bit representing whether the frame is a retransmitted frame and the field representing the number of times of transmission are provided in a frame control field.

FIG. 11 illustrates, in the format of a flowchart, another processing procedure by the communication device of the embodiment for controlling information related to retransmission of data. The flowchart in FIG. 11 assumes the processing in the communication device operating as an STA. This processing procedure is different from the processing procedure illustrated in FIG. 6 in that the success in reception of (at least one piece of) transmission data from other STAs is added as the condition of the communication device for initializing information related to retransmission of data stored in a header of a frame.

First, the communication device performs data transmission in accordance with a current communication mode of a communication system (Step S1101), and receives a data reception result from a data transmission destination (Step S1102). Then, the communication device checks whether the data transmission destination has succeeded in reception (Step S1103). Here, when the data transmission destination has succeeded in reception (Yes at Step S1103), the communication device initializes the inner counter of the number of times of retransmission regarding the data.

By contrast, when the data transmission destination has failed in reception (No at Step S1103), the communication device checks whether the counter of the number of times of retransmission regarding the data has reached an upper limit value (Step S1105). When the number of times of retransmission of the data has reached the upper limit value (Yes at Step S1105), the communication device disposes the transmission data (Step S1106), and initializes the inner counter of the number of times of retransmission regarding the data.

Moreover, when the number of times of retransmission has not reached the upper limit value (No at Step S1105), the communication device checks whether a communication mode of the communication system in which the communication device currently performs communication operation has been switched to another communication mode, that is, whether the communication mode has been switched to another communication mode before the data transmission destination succeeds in reception or before the counter of the number of times of retransmission reaches the predetermined upper limit value so that the data is disposed (Step S1107).

When the communication mode has not been switched (No at Step S1107), the communication device then checks whether the data is retransmitted for the first time (Step S1111). When the data is retransmitted for the first time (Yes at Step S1111), the communication device sets a bit in a header representing whether the frame is a retransmitted frame to 1 (Step S1112). Then, the communication device increases by one a value of a field in the header representing the number of times of retransmission of the frame (Step S1113) before returning to Step S1101 to retransmit the data.

By contrast, when the communication mode has been switched to another communication mode before the data transmission destination succeeds in reception or before the counter of the number of times of retransmission reaches the predetermined upper limit value so that the data is disposed (Yes at Step S1107), the communication device further checks whether (at least one piece of) the transmission data from other STAs has been received successfully (Step S1108).

When the transmission data from other STAs has been also failed (No at Step 1108), the communication device does not initialize the information related to retransmission of data stored in the header of the frame, and proceeds to Step S1111 to check whether the data is retransmitted for the first time. When the data is retransmitted for the first time (Yes at Step S1111), the communication device sets the bit in the header representing whether the frame is a retransmitted frame to 1 (Step S1112). Then, the communication device increases by one a value of the field in the header representing the number of times of retransmission of the frame (Step S1113) before returning to Step S1101 to retransmit the data.

By contrast, when (at least one piece of) transmission data from other STAs has been received successfully (Yes at S1108), the communication device initializes the bit in the header representing whether the frame is a retransmitted frame (Step S1109) and initializes a value of the field in the header representing the number of times of retransmission of the frame (Step S1110).

Further, FIG. 12 illustrates, in the form of a flowchart, still another processing procedure by the communication device of the embodiment for controlling information related to retransmission of data. The flowchart in FIG. 12 assumes the processing in the communication device operating as an STA. In this processing procedure, the communication device defines, as the condition for initializing the information related to retransmission of data stored in a header of a frame, only the time of normally receiving transmission data and the time of reaching an upper limit of the number of times of retransmission. That is, the communication device does not initialize the information related to retransmission of data stored in a header of a frame in switching of communication modes, and takes over the information in a communication mode before switching.

First, the communication device performs data transmission in accordance with a current communication mode of a communication system (Step S1201), and receives a data reception result from a data transmission destination (Step S1202). Then, the communication device checks whether the data transmission destination has succeeded in reception of the data (Step S1203). Here, when the data transmission destination has succeeded in reception (Yes at Step S1203), the communication device initializes the inner counter of the number of times of retransmission regarding the data.

By contrast, when the data transmission destination has failed in reception of the data (No at Step S1203), the communication device checks whether the counter of the number of times of retransmission regarding the data has reached an upper limit value (Step S1205). When the number of times of retransmission of the data has reached the upper limit value (Yes at Step S1205), the communication device disposes the transmission data (Step S1206), and initializes the inner counter of the number of times of retransmission regarding the data.

Moreover, when the number of times of retransmission of the data has not reached the upper limit value (No at Step S1205), the communication device checks whether the data is retransmitted for the first time (Step S1207) regardless of whether the communication mode of the communication system has been switched to another communication mode. When the data is retransmitted for the first time (Yes at Step S1207), the communication device sets a bit in a header representing whether the frame is a retransmitted frame to 1 (Step S1208). Then, the communication device increases by one a value of a field in the header representing the number of times of retransmission of the frame (Step S1209) before returning to Step S1201 to retransmit the data.

Third Embodiment

In the third embodiment, a communication device operating as an STA includes an inner counter for counting the number of times of retransmission of data for each operable communication mode, and controls the count of the number of times of retransmission independently for each communication mode. Moreover, the communication device performs, when data to be transmitted (a header, for example) contains a bit that notifies retransmission or a field that notifies the number of times of retransmission, the notification on the basis of the inner counter corresponding to a current communication mode. However, the communication device may include the inner counter only for a part of communication modes operable in the communication system.

The following will describe a concrete method of controlling the count of the number of times of retransmission independently for each communication mode.

FIG. 7 illustrates an example of a communication sequence between a base station (AP) and terminals (STA) performed in a communication system in the embodiment. In FIG. 7, each square represents a frame, and arrows represent transmission directions (upward arrow represents an uplink, downward arrow represents a downlink) A frame with a notation of Trigger is a trigger frame, and a frame with a notation of DATA is a data frame. Moreover, the horizontal axis represents time, and the frames transmitted at the same time represent those of multiuser multiplex transmission.

Moreover, each STA has a counter of the number of times of retransmission for each communication mode. The number of communication modes of each STA may be set when the STA is connected to the AP. For example, the STA notifies the AP of information related to its operable communication modes and communication modes with an independent counter (for example, the type and number of communication modes that can be held in a distinguished manner). To simplify the description, it is assumed in FIG. 7 that the switching is performed only between two modes of a communication mode 1 and a communication mode 2. Moreover, it is assumed that the STA holds a counter of the number of times of retransmission independently for each of the communication mode 1 and the communication mode 2.

First, it is assumed that the communication system is in the communication mode 1. For example, the communication mode 1 is a centralized wireless communication mode such as an uplink multiuser multiplex mode, for example, in which each STA transmits data at timing controlled by the AP.

The AP transmits a trigger frame 701 to the STAs 1 to 3 under control in a format that can be received by a plurality of STAs. The trigger frame 701 contains permission of data transmission for each STA, a traffic allowing transmission, a frequency resource, and a space resource, transmission power, a modulation and coding scheme, and other parameters that are used in transmission.

The STA receives the trigger frame 701, and transmits, once data transmission is permitted, a data frame by a specified method. Here, each STA sets the inner counter of the number of times regarding each data in the communication mode 1 to 0 (that is, mode1 retry=0). When this is the first data transmission of the STA after being connected to the AP, the STA may also set the counter in the communication mode 2 to 0 (that is, mode2 retry=0). The STA may set the counters in all the communication modes to 0 when connected to the AP.

Although the illustration is omitted in FIG. 7, the STAs 1 to 3 may store, in a header of a frame, information related to retransmission of data such as a bit representing whether the frame is a retransmitted frame or a field representing the number of times of retransmission of the frame, and transmit it.

Next, it is assumed that the AP has failed in receiving a data frame 711 transmitted by the STA1, while the AP has successfully received data 712, 713 transmitted by the STA2 and the STA3. The AP transmits an M-BA5 frame 702 in a format that can be received by a plurality of STAs or transmits a BA frame (not illustrated) to each STA by downlink multiplex transmission or a plurality of times of single user transmission so as to notify each STA of the reception result.

Notified of the reception result by the AP, each STA prepares for transmission of the next new data when the reception of the data frame has succeeded, while it prepares for retransmission of the data when the reception of the data frame has failed. In the example of FIG. 7, the AP has failed in receiving the data frame 711 transmitted from the STA1, and the STA1 prepares for transmission of a retransmission data frame 721.

Here, the STA1 sets the inner counter of the number of times of retransmission regarding data in the communication mode 1 to 1 (that is, mode1 retry=1). Thereafter, every time the retransmission is repeated, the STA1 increases the counter of the number of times of retransmission one by one to 2, 3 for setting. Moreover, the STA1 keeps the counter of the number of times of retransmission regarding data in the communication mode 2 as it is. Then, the STA1 sets a field in a header of the retransmission data frame 721 representing how many times the frame has been retransmitted, on the basis of the counter of the number of times of retransmission in a current communication mode.

Meanwhile, data frames 712, 713 transmitted from the STA2 and the STA3 are received successfully. Thus, the STA2 and the STA3 prepare for transmission of the next new data frames 722, 723, respectively. Here, each of the STA2 and the STA3 keeps the inner counter of the number of times of retransmission in the communication mode 1 and the communication mode 2 as they are. Moreover, the STA2 and the STA3 set a field in the header of the retransmission data frame 721 representing how many times the frame has been retransmitted, on the basis of the counter of the number of times of retransmission in a current communication mode.

Subsequently, there are repeatedly performed transmission of trigger frames from the AP, transmission or retransmission of data from each STA permitted to transmit data, and notification of reception results through M-BA frames and the like from the AP.

Here, it is assumed that the STA1 performs retransmission, and then the communication mode 1 has been switched to the communication mode 2 in the communication system before the AP succeeds in reception or before the counter of the number of times of retransmission reaches a predetermined upper limit value so that the data is disposed. For example, the communication mode 2 is an autonomous distributed wireless communication mode, and the STA transmits data at timing when other STAs are not transmitting data after random waiting time has elapsed.

Here, when the STA1 retransmits, for the first time after the communication mode has been switched to 2, data whose transmission has failed in the communication mode 1, the STA1 switches to use the inner counter of the number of times of retransmission regarding the data in the communication mode 2, and takes over a value held by the counter as it is. Moreover, the STA1 holds a value of the counter of the number of times of retransmission regarding the data in the communication mode 1. The STA2 and the STA3 also switch to use the inner counter of the number of times of retransmission in the communication modes 2, take over a value held by the counter for the communication mode 2 as it is, and hold a value of the counter of the number of times of retransmission regarding the data in the communication mode 1.

That is, in the third embodiment, each STA uses the counters of the number of times of retransmission in each communication mode while switching it in accordance with the communication mode.

Although the illustration is omitted, also when the communication mode 2 has been switched to the communication mode 1 in the communication system, each STA switches to use the inner counter of the number of times of retransmission in the communication modes 1, takes over a value held by the counter for the communication mode 1 as it is, and holds a value of the counter of the number of times of retransmission regarding the data in the communication mode 2.

Moreover, when the counter of the number of times of retransmission in any of the communication modes has reached an upper limit value of the number of times of retransmission so that the transmission of the data is relinquished, the STA initializes the counters of the number of times of retransmission regarding the data in all the communication modes. Here, the upper limit value of the number of times of retransmission may be set individually for the counter of the number of times of retransmission in each communication mode. The upper limit value for each communication mode may be a common value or a different value for each communication mode. Moreover, with an upper limit value set for a total value of counters of the number of times of retransmission in the communication modes, the counters of the number of times of retransmission regarding the data in all the communication modes may be initialized when the total value has reached the upper limit value. Moreover, when the STA has succeeded in data transmission in any of communication modes, it initializes the counter of the number of times of retransmission regarding the data in all the communication modes.

Moreover, the STA may set a bit in a header of a data frame representing whether the frame is a retransmitted frame or a field representing how many times the frame has been retransmitted, on the basis of the counter of the number of times of retransmission in a current communication mode. When the frame has been transmitted in a previous communication mode although it is transmitted for the first time in a current communication mode, the STA may set a bit or a field related to retransmission on the basis of the counters of the number of times of retransmission in all the communication modes. The STA may store the information related to retransmission in each communication mode in the header.

Further, when in a certain communication mode, the STA retransmits data temporarily by a communication method in another communication mode, such retransmission is processed using the counter in the communication mode used temporarily.

In a wireless standard such as IEEE802.11ax, for example, each STA is permitted to perform random access or competition access to media using a collision avoidance mechanism such as EDCA in a centralized communication mode in which uplink multiuser multiplex transmission is performed under control of an AP (that is, without switching to an autonomous distributed communication mode). When data is retransmitted by competition access in the centralized communication mode, the STA preferably performs counting as the number of times of retransmission in the autonomous distributed communication mode.

The following effects are exerted by the action of each STA controlling the count of the number of times of retransmission independently for each communication mode.

The factor for the failure in data reception may be essentially different between communication modes. Therefore, the recovery by retransmission is preferably performed independently in each communication mode. However, when the communication mode is switched to the communication mode 2 after an STA has performed a number of times of retransmission in the communication mode 1, and the STA takes over the counter of the number of times of retransmission in the communication mode 1 as it is, the retransmission in the communication mode 2 reaches an upper limit value earlier than usual so that the data is disposed. Meanwhile, the embodiment is arranged so that the STA has a counter of the number of times of retransmission independently for each communication mode, and switches the counters of the number of times of retransmission in accordance with a communication mode. In this manner, it is possible to achieve recovery by retransmission performed independently for each communication mode, preventing inappropriate disposal of data. In addition, also in the communication environments where a plurality of communication modes are switched frequently for use, the counter of the number of times of retransmission is repeatedly initialized every time the communication modes are switched, preventing repeated retransmission.

FIG. 8 illustrates, in the form of a flowchart, a processing procedure by the communication device of the embodiment for controlling information related to retransmission of data. However, the flowchart in FIG. 8 assumes the communication operation of the STA. The communication device includes an inner counter for counting the number of times of retransmission of data for each operable communication mode, and controls the count of the number of times of retransmission independently for each communication mode. Then, in switching of communication modes, the communication device takes over a value held by the counter after switching as it is and holds a value of the counter for the number of times of retransmission regarding the data before switching.

First, the communication device performs data transmission in accordance with a current communication mode of a communication system (Step S801), and receives a data reception result from a data transmission destination (Step S802). Then, the communication device checks whether the data transmission destination has succeeded in reception (Step S803).

Here, when the data transmitted by the communication device itself has been received successfully (Yes at Step S803), the communication device initializes counters of the number of times of retransmission regarding the data in all the communication modes (Step S804).

By contrast, when the data transmission destination has failed in receiving the data (No at Step S803), the communication device checks whether the counter of the number of times of retransmission regarding the data has reached an upper limit value (Step S805).

The upper limit value of the number of times of retransmission here may be set individually for the counter of the number of times of retransmission in each communication mode. The upper limit value for each communication mode may be a common value or a different value for each communication mode. Then, the determination at Step S805 is Yes when the counter in any one of the communication modes has reached the upper limit value, while it is No when the counters in all the communication modes are smaller than the upper limit value.

Alternatively, one upper limit value may be set with respect to a total value of the counters of the number of times of retransmission in the communication modes. Then, the determination at Step S805 is Yes once the total value of the counters of the number of times of transmission in the communication modes reaches the upper limit value, while it is No when the total value is smaller than the upper limit value.

Then, when the number of times of retransmission of the data has reached the upper limit value (Yes at Step S805), the communication device disposes the transmission data (Step S806), and initializes the counters of the number of times of retransmission regarding the data in all the communication modes (Step S804).

Moreover, when the number of times of retransmission of the data has not reached the upper limit value (No at Step S805), the communication device checks whether the communication mode of the communication system has been switched to another communication mode (Step S807). When the communication mode has not been switched (No at Step S807), the communication device increases by one the counter of the number of times of retransmission regarding the data in the current communication mode (Step S809) before returning to Step S801 to retransmit the data.

By contrast, when the communication mode has been switched to another communication mode before the data transmission destination succeeds in reception or before the counter of the number of times of retransmission reaches the predetermined upper limit value so that the data is disposed (Yes at Step S807), the communication device takes over and use a value held by the counter of the number of times of retransmission in a communication mode after switching (Step S808). Moreover, the communication device holds a value of the counter of the number of times of retransmission regarding the data before switching. Then, returning to the Step S801, the communication device retransmits the data in the communication mode after switching.

FIG. 13 illustrates, in the form of a flowchart, another processing procedure by the communication device of the embodiment for controlling information related to retransmission of data. The flowchart in FIG. 13 assumes the communication operation of an STA. This processing procedure is different from the processing procedure in FIG. 8 in that it is assumed that the communication device does not have an inner counter for a part of a plurality of communication modes in a communication system.

First, the communication device performs data transmission in accordance with a current communication mode of a communication system (Step S1301), and receives a data reception result from a data transmission destination (Step S1302). Then, the communication device checks whether the data transmission destination has succeeded in reception (Step S1303).

Here, when the data transmitted by the communication device itself has been received successfully (Yes at Step S1303), the communication device initializes counters of the number of times of retransmission regarding the data in all the communication modes (Step S1304).

By contrast, when the data transmission destination has failed in reception of the data (No at Step S1303), the communication device checks whether the counter of the number of times of retransmission regarding the data has reached an upper limit value (Step S1305). The upper limit value of the counter of the number of times of retransmission here is an upper limit value set individually for the counter of the number of times of retransmission in each communication mode or an upper limit value set for a total value of the counters of the number of times of retransmission in the communication modes, for example (similarly to the above description).

Then, when the number of times of retransmission regarding the data has reached the upper limit value (Yes at Step S1305), the communication device disposes the transmission data (Step S1306), and initializes the counter of the number of times of retransmission regarding the data in all the communication modes (Step S1304).

Moreover, when the number of times of retransmission of the data has not reached the upper limit value (No at Step S1305), the communication device checks whether the communication mode of the communication system has been switched to another communication mode (Step S1307). When the communication mode has not been switched (No at Step S1307), the communication device increases by one the counter of the number of times of retransmission regarding the data in a current communication mode (Step S1310) before returning to Step S1301 to retransmit the data.

By contrast, when the communication mode has been switched to another communication mode before the data transmission destination succeeds in reception or before the counter of the number of times of retransmission reaches the predetermined upper limit value so that the data is disposed (Yes at Step S1307), the communication device further checks whether a counter of the number of times of retransmission in a communication mode after switching exists (Step S1308).

Here, when the counter of the number of times of retransmission in the communication mode after switching exists (Yes at Step S1308), the communication device takes over and uses a value held by the counter of the number of times of retransmission in the communication mode after switching as it is (Step S1309). Moreover, the communication device holds a value of the counter of the number of times of retransmission regarding the data before switching. Then, returning to Step S1301, the communication device retransmits the data in the communication mode after switching.

By contrast, when the counter of the number of times of retransmission in the communication mode after switching does not exist (No at Step S1308), the communication device redefines a counter of the number of times of retransmission (Step S1311). To be more specific, the communication device processes the number of times of retransmission in the last communication mode for which a counter of the number of times of retransmission exists as the number of times of retransmission in a current communication mode, without taking over the counter of the number of times of retransmission in switching of communication modes. Thereafter, the communication device increases by one the counter of the number of times of retransmission regarding the data (Step S1310) before returning to Step S1301 to retransmit the data.

INDUSTRIAL APPLICABILITY

The technology disclosed in the present specification has been described in detail with reference to the certain embodiments. However, it is obvious that a person skilled in the art can modify or substitute the embodiments without departing from the scope of the technology disclosed in the present specification.

The technology disclosed in the present specification can be applied to the wireless LAN standard such as IEEE802.11ax, for example, and can be also applied in the same manner to other various wireless communication standards supporting a plurality of communication modes, achieving appropriate data retransmission control over the communication modes.

In addition, the technology disclosed in the present specification can be achieved as data processsing in a MAC layer, for example. However, it is natural that the technology can be achieved as data processing in an upper layer or a lower layer than the MAC layer.

Note that the effects described above are not necessarily limitative. With or in the place of the above effects, there may be achieved any one of the effects described in this specification or other effects that may be grasped from this specification.

Additionally, the present technology may also be configured as below.

(1) A communication device, including circuitry configured to communicate with an access point according to a plurality of communication modes including at least a centralized communication mode and an autonomous distributed communication mode; transmit data according to a first mode of the plurality of modes; maintain a counter that indicates a number of times retransmission of the data has been performed according to the first mode; switch from performing communication according to the first mode to performing communication according to the second mode; initialize the counter in response to the switching; and retransmit the data according to the second mode upon initialization of the counter.

(2) The communication device of (1), wherein the circuitry is configured to initialize the counter every time the communication mode is switched.

(3) The communication device of any of (1) to (2), wherein the circuitry is configured to control initializing information related to retransmission of the data in the second mode based on results of data communication by other communication devices in the first communication mode.

(4) The communication device of any of (1) to (3), wherein the circuitry is configured to initialize information within the data each time the communication mode is switched.

(5) The communication device of any of (1) to (4), wherein the data includes at least one of a bit that indicates that the data is being retransmitted or a field that indicates a number of times the data is being retransmitted, and the circuitry is configured to initialize the bit or the field each time the communication mode is switched.

(6) The communication device of any of (1) to (5), wherein the centralized communication mode is a multiuser multiplex transmission mode.

(7) A communication device including circuitry configured to communicate with an access point according to at least a first communication mode and a second communication mode; transmit data according to a first mode of the plurality of modes; maintain a counter that indicates a number of times retransmission of the data has been performed according to the first mode; modify a field included in the data transmitted according to the first mode based on a value of the counter; and retransmit the data including the modified field.

(8) The communication device of (7), wherein the circuitry is configured to control a value of the field based on a switch between the first communication mode and the second communication mode.

(9) A communication device including circuitry configured to communicate with an access point according to a plurality of communication modes including at least a centralized communication mode and an autonomous distributed communication mode; transmit data according to the plurality of modes; and store information indicating a number of times retransmission of data has been performed in each of the plurality of modes.

(10) The communication device of (9), wherein the circuitry is configured to transmit the information to the access point.

(11) The communication device of any of (9) to (10), wherein the circuitry is configured to include information related to retransmission of data in a current communication mode in a data frame for transmission.

(12) The communication device of any of (9) to (11), wherein the circuitry is configured to maintain a first counter corresponding to a number of times data has been transmitted according to a first mode of the plurality of modes and a second counter corresponding to a number of times data has been transmitted according to a second of the plurality of modes.

(13) The communication device of (12), wherein the circuitry is configured to initialize the first counter and the second counter when the number of times of retransmission of data in at least one communication mode reaches a first threshold.

(14) The communication device of (12), wherein the circuitry is configured to initialize information related to retransmission of the data in all the communication modes when a total value of the number of times of retransmission of data in the plurality of communication modes reaches a second threshold.

(15) The communication device of (12), wherein the circuitry is configured to initialize information related to retransmission of the data in the plurality of communication modes when data retransmitted in any of the plurality of communication modes has been received normally.

(16) The communication device of (10), wherein in a first communication mode, the circuitry is configured to control retransmission of data performed temporarily in a second communication mode as information related to retransmission of data in the second communication mode.

(17) A communication method, including communicating with an access point according to a plurality of communication modes including at least a centralized communication mode and an autonomous distributed communication mode; transmitting data according to a first mode of the plurality of modes; maintaining a counter that indicates a number of times retransmission of the data has been performed according to the first mode; switching from performing communication according to the first mode to performing communication according to the second mode; initializing the counter in response to the switching; and retransmitting the data according to the second mode upon initialization of the counter.

(18) A communication method including communicating with an access point according to at least a first communication mode and a second communication mode; transmitting data according to a first mode of the plurality of modes; maintaining a counter that indicates a number of times retransmission of the data has been performed according to the first mode; modifying a field included in the data transmitted according to the first mode based on a value of the counter; and retransmitting the data including the modified field

(19) A communication method including communicating with an access point according to a plurality of communication modes including at least a centralized communication mode and an autonomous distributed communication mode; transmitting data according to the plurality of modes; and storing information indicating a number of times retransmission of data has been performed in each of the plurality of modes.

(20) The communication method of (19), further including maintaining a first counter corresponding to a number of times data has been transmitted according to a first mode of the plurality of modes and a second counter corresponding to a number of times data has been transmitted according to a second of the plurality of modes.

REFERENCE SIGNS LIST 200 communication device
201 data processing unit
202 control unit
203 communication unit
204 power source unit
211 modulation and demodulation unit
212 space signal processing unit
213 channel estimation unit
214 wireless interface unit
215 amplifier unit
216 antenna

The invention claimed is:
1. A communication device, comprising:
circuitry configured to
communicate with an access point according to a plurality of communication modes including at least a centralized communication mode in which uplink multiuser multiplex transmission is performed under control of a base station, and an autonomous distributed communication mode in which media is randomly accessed using a collision avoidance mechanism;
transmit data according to a first mode of the plurality of modes;
maintain a counter that indicates a number of times retransmission of the data has been performed according to the first mode;
switch from performing communication according to the first mode to performing communication according to the second mode;
determine whether second data has been successfully received;
initialize or increment the counter in response to whether the second data has been successfully received; and
retransmit the data according to the second mode upon initialization or incrementing of the counter.
2. The communication device of claim 1, wherein
the circuitry is configured to initialize or increment the counter every time the communication mode is switched.
3. The communication device of claim 1, wherein
the circuitry is configured to control initializing information related to retransmission of the data in the second mode based on results of data communication of the second data by other communication devices in the first communication mode.

4. The communication device of claim 1, wherein the circuitry is configured to initialize or increment information within the data each time the communication mode is switched.

5. The communication device of claim 1, wherein the data includes at least one of a bit that indicates that the data is being retransmitted or a field that indicates a number of times the data is being retransmitted, and the circuitry is configured to initialize the bit or initialize or increment the field each time the communication mode is switched.

6. The communication device of claim 1, wherein the centralized communication mode is a multiuser multiplex transmission mode.

7. A communication device, comprising:
circuitry configured to
communicate with an access point according to at least a first communication mode and a second communication mode;
transmit data according to a first mode of the plurality of modes;
maintain a counter that indicates a number of times retransmission of the data has been performed according to the first mode;
modify a field included in the data transmitted according to the first mode based on a value of the counter; and
retransmit the data including the modified field,
wherein the circuitry is configured to determine whether second data has been successfully received and to control a value of the field based on whether the second data has been successfully received.

8. The communication device of claim 7, wherein the circuitry is configured to control a value of the field based on a switch between the first communication mode and the second communication mode.

9. A communication device, comprising:
circuitry configured to
communicate with an access point according to a plurality of communication modes including at least a centralized communication mode in which uplink multiuser multiplex transmission is performed under control of a base station, and an autonomous distributed communication mode in which media is randomly accessed using a collision avoidance mechanism;
transmit data according to the plurality of modes;
determine whether second data has been successfully received; and
store information indicating a number of times retransmission of data has been performed in each of the plurality of modes and indicating whether the second data has been successfully received.

10. The communication device of claim 9, wherein the circuitry is configured to transmit the information to the access point.

11. The communication device of claim 9, wherein the circuitry is configured to include information related to retransmission of data in a current communication mode in a data frame for transmission.

12. The communication device of claim 9, wherein the circuitry is configured to maintain a first counter corresponding to a number of times data has been transmitted according to a first mode of the plurality of modes and a second counter corresponding to a number of times data has been transmitted according to a second of the plurality of modes.

13. The communication device of claim 12, wherein the circuitry is configured to initialize the first counter and the second counter when the number of times of retransmission of data in at least one communication mode reaches a first threshold.

14. The communication device of claim 12, wherein the circuitry is configured to initialize information related to retransmission of the data in all the communication modes when a total value of the number of times of retransmission of data in the plurality of communication modes reaches a second threshold.

15. The communication device of claim 12, wherein the circuitry is configured to initialize information related to retransmission of the data in the plurality of communication modes when data retransmitted in any of the plurality of communication modes has been received normally.

16. The communication device of claim 10, wherein in a first communication mode, the circuitry is configured to control retransmission of data performed temporarily in a second communication mode as information related to retransmission of data in the second communication mode.

17. A communication method, comprising:
communicating with an access point according to a plurality of communication modes including at least a centralized communication mode in which uplink multiuser multiplex transmission is performed under control of a base station, and an autonomous distributed communication mode in which media is randomly accessed using a collision avoidance mechanism;
transmitting data according to a first mode of the plurality of modes;
maintaining a counter that indicates a number of times retransmission of the data has been performed according to the first mode;
switching from performing communication according to the first mode to performing communication according to the second mode;
determining whether second data has been successfully received;
initializing or incrementing the counter in response to whether the second data has been successfully received; and
retransmitting the data according to the second mode upon initialization or incrementing of the counter.

18. A communication method, comprising:
communicating with an access point according to at least a first communication mode and a second communication mode;
transmitting data according to a first mode of the plurality of modes;
maintaining a counter that indicates a number of times retransmission of the data has been performed according to the first mode;
modifying a field included in the data transmitted according to the first mode based on a value of the counter; and
retransmitting the data including the modified field,
wherein the method comprises determining whether second data has been successfully received and controlling a value of the field based on whether the second data has been successfully received.

19. A communication method, comprising:
- communicating with an access point according to a plurality of communication modes including at least a centralized communication mode in which uplink multiuser multiplex transmission is performed under control of a base station, and an autonomous distributed communication mode in which media is randomly accessed using a collision avoidance mechanism;
- transmitting data according to the plurality of modes;
- determining whether second data has been successfully received; and
- storing information indicating a number of times retransmission of data has been performed in each of the plurality of modes and indicating whether the second data has been successfully received.

20. The communication method of claim 19, further comprising:
- maintaining a first counter corresponding to a number of times data has been transmitted according to a first mode of the plurality of modes and a second counter corresponding to a number of times data has been transmitted according to a second of the plurality of modes.

* * * * *